US 8,605,593 B2

(12) United States Patent
Yabusaki et al.

(10) Patent No.: US 8,605,593 B2
(45) Date of Patent: Dec. 10, 2013

(54) TRANSPORT CONTROL SERVER, TRANSPORT CONTROL SYSTEM, AND TRANSPORT CONTROL METHOD

(75) Inventors: Hitoshi Yabusaki, Tokyo (JP); Daisuke Matsubara, Yokohama (JP); Yukiko Takeda, Higashimurayama (JP); Yoji Ozawa, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 182 days.

(21) Appl. No.: 13/207,504

(22) Filed: Aug. 11, 2011

(65) Prior Publication Data

US 2012/0069739 A1     Mar. 22, 2012

(30) Foreign Application Priority Data

Sep. 16, 2010   (JP) ................................. 2010-207607

(51) Int. Cl.
*G01R 31/08* (2006.01)
(52) U.S. Cl.
USPC ......... 370/235; 370/230.1; 370/234; 370/229
(58) Field of Classification Search
USPC .............. 370/229, 230.1, 233, 234, 235, 253, 370/395.3; 709/223–225, 249
See application file for complete search history.

(56) References Cited

U.S. PATENT DOCUMENTS

| 6,829,643 | B1 | 12/2004 | Tobe et al. | |
| 2005/0002331 | A1* | 1/2005 | Nolle et al. | 370/229 |
| 2005/0132088 | A1* | 6/2005 | Sridhar et al. | 709/249 |
| 2008/0212482 | A1 | 9/2008 | Nakayma et al. | |
| 2008/0225712 | A1* | 9/2008 | Lange | 370/230.1 |
| 2008/0291919 | A1* | 11/2008 | Dunbar et al. | 370/395.3 |
| 2011/0134791 | A1* | 6/2011 | So | 370/253 |

FOREIGN PATENT DOCUMENTS

| JP | 9-224025 A | 8/1997 |
| JP | 2001-217842 A | 8/2001 |
| JP | 2005-94392 A | 4/2005 |
| JP | 2008-172517 A | 7/2008 |
| JP | 2010-4495 A | 1/2010 |
| JP | 2010-28185 A | 2/2010 |
| WO | WO 2010/109767 A1 | 9/2010 |

* cited by examiner

*Primary Examiner* — Anh-Vu Ly
*Assistant Examiner* — Gustavo Lopez-Vargas
(74) *Attorney, Agent, or Firm* — Crowell & Moring LLP

(57) ABSTRACT

A transport control server coupled to a plurality of nodes in a network through which a plurality of traffics passes through is provided. The transport control server is configured to receive bandwidth information from each of the nodes when the traffics pass through the nodes. For each of the traffics, the transport control server calculates bandwidths at an entry edge node and at an exit edge node based on the received bandwidth information. The transport control server defines as a first traffic, based on the calculated bandwidths at the entry edge node and the exit edge node, a traffic having a discarded bandwidth that is larger than a first predetermined bandwidth. Also, the transport control server defines as a second traffic, based on the received bandwidth information, a first traffic having a bandwidth at the two or more nodes that exceeds a specified second bandwidth.

16 Claims, 13 Drawing Sheets

FIG. 5

| 501 | 502 | 503 | 504 | 505 | 506 | 507 | 508 | 513 | 509 | 510 | 511 | 512 |
|---|---|---|---|---|---|---|---|---|---|---|---|---|
| TRAFFIC ID | VIRTUAL NW ID | EDGE NODE ID (ENTRY, EXIT) | MINIMUM BANDWIDTH | TRANSIT NODE ID | TRANSIT LINK ID | MEASUREMENT BAND (ENTRY, EXIT) | OVERFLOW FLAG | BAND CONTROL STATE | MAXIMUM BANDWIDTH | AVERAGE DIFFERENCE BAND | BURST DIFFERENCE BANDWIDTH | LIMIT DIFFERENCE BAND |
| 1 | 1 | 1, 5 | 10 Mbps | 1, 2, 4, 5 | a, b, d | 500, 10 Mbps | YES | OFF | — | 400 Mbps | 490 Mbps | 30 Mbps |
| 2 |   | 1, 6 | 3 Mbps | 1, 2, 4, 6 | a, b, e | 40, 4 Mbps | NO | OFF | 30 Mbps | 15 Mbps | 38 Mbps | 20 Mbps |
| 3 |   | ... | ... | ... | ... | ... | ... | ... | ... | ... | ... | ... |
| 4 | 2 |   |   |   |   |   |   |   |   |   |   |   |
| 5 |   |   |   |   |   |   |   |   |   |   |   |   |

| NODE ID 521 | CONFIGURATION PORTION 522 | VIRTUAL NWID 523 | PROCESSING SPEED 524 | BANDWIDTH UTILIZATION RATE 525 | LOSS RATE 526 | AVAILABLE BAND 527 | CONTROLLED AVAILABLE BAND 529 | TARGET BANDWIDTH UTILIZATION RATE 5201 | TARGET LOSS RATE 5202 |
|---|---|---|---|---|---|---|---|---|---|
| 1 | COMMON 1 | 1 | 4000 Mbps | 40% | 1% | 1600 Mbps | 1600 Mbps | 35% | 0.8% |
| | COMMON 2 | 2 | 3000 Mbps | 80% | 6% | 2400 Mbps | 800 Mbps | 35% | 0.8% |
| | COMMON 3 | 3 | 3000 Mbps | 30% | 0% | 900 Mbps | 900 Mbps | 35% | 0.8% |
| | PORT 1 | ... | | | | | | | |
| 2 | ... | | | | | | | | |
| ... | ... | | | | | | | | |

| NODE ID | PORT ID | CONNECTION LINK ID | ADJACENT NODE ID | CONNECTION NODE PORT ID |
|---|---|---|---|---|
| 1 | 1 | – | – | – |
|   | 2 | a | 2 | 1 |
| 2 | 1 | a | 1 | 2 |
|   | 2 | b | 4 | 1 |
| 3 | 1 | c | 4 | 2 |
|   | 2 | – | – | – |
| 4 | 1 | b | 2 | 2 |
|   | 2 | c | 3 | 1 |
|   | 3 | d | 5 | 1 |
|   | 4 | e | 6 | 1 |
| 5 | 1 | d | 4 | 3 |
|   | 2 | – | – | – |
| 6 | 1 | e | 4 | 4 |
|   | 2 | – | – | – |

FIG. 8

| NODE ID 541 | VIRTUAL NWID 542 | PORT ID (ENTRY, EXIT) 543 | TRANSIT CONFIGURATION PORTION 544 | LOSS RATE 545 | CONGESTION FLAG 546 | CONTROL-TARGET TRAFFIC ID 547 | TARGET LOSS RATE 548 540 |
|---|---|---|---|---|---|---|---|
| 1 | 1 | 1, 2 | COMMON 1, COMMON 2 | 1% | NO | 1, 2, 3 | 2% — 5401 |
| | | 1, 3 | COMMON 1, COMMON 3 | 1% | NO | 5, 8 | 2% — 5402 |
| | | 1, 4 | COMMON 1 | 2% | NO | 11 | 2% — 5403 |
| | 2 | 1, 2 | COMMON 1, COMMON 2 | 10% | YES | 13, 16 | 3% — 5404 |
| | | 1, 3 | COMMON 1, COMMON 3 | 1% | NO | – | 2% |
| | | 1, 4 | COMMON 1 | 2% | NO | 17 | 2% |
| ... | ... | ... | ... | ... | ... | ... | ... |

TRANSPORT CONTROL SERVER, TRANSPORT CONTROL SYSTEM, AND TRANSPORT CONTROL METHOD

CLAIM OF PRIORITY

The present application claims priority from Japanese patent application JP 2010-207607 filed on Sep. 16, 2010, the content of which is hereby incorporated by reference into this application.

FIELD OF THE INVENTION

The present invention relates to a transport control server (TCS) and more particularly to a transport control server that limits a traffic band.

BACKGROUND OF THE INVENTION

Conventional transport control systems use various technologies to automatically design path routes in order to configure and control paths for MPLS (Multi-Protocol Label Switching).

For example, Japanese Unexamined Patent Application Publication No. 2001-217842 discloses the LAN-type network controller that dynamically controls traffic in flexible response to states of the network traffic in a conventional network used by users. The LAN-type network controller described in Japanese Unexamined Patent Application Publication No. 2001-217842 analyzes information about users based on a packet information database and selects a band control method corresponding to the analysis result when packets passing through the controller cause a traffic volume to exceed a threshold value. Using the selected band control method, the controller enables or disables the band control to automatically control the network band.

Japanese Unexamined Patent Application Publication No. 2005-094392 discloses the apparatus that uses the number of received packets to be dropped and an average queue length to determine whether to drop a packet to be received. The apparatus described in Japanese Unexamined Patent Application Publication No. 2005-094392 calculates a stored drop cycle based on the number of received packets to be dropped and the average queue length. A drop comparison portion provided for the apparatus compares the number of packets dropped with the stored drop cycle. Based on the comparison result, the apparatus determines whether to drop the received packet. A packet drop portion drops a packet before it is queued when the packet needs to be dropped. In this manner, the apparatus described in Japanese Unexamined Patent Application Publication No. 2005-094392 fast and highly efficiently controls packet congestion.

The method disclosed in Japanese Unexamined Patent Application Publication No. 2010-004495 controls call acceptance in consideration for not only band information but also the packet processing performance.

The system disclosed in Japanese Unexamined Patent Application Publication No. 2008-172517 effectively controls congestion of service networks provided for an IP network that provides various communication services including a VoIP service. The system according to Japanese Unexamined Patent Application Publication No. 2008-172517 restricts input to a subscriber accommodation node. To do this, a congestion control server transmits an instruction for control message routing restriction to an edge node. In this manner, the system according to Japanese Unexamined Patent Application Publication No. 2008-172517 effectively controls the congestion.

The congestion control method disclosed in Japanese Unexamined Patent Application Publication No. Hei9 (1997)-224025 ensures high throughput for the entire network, prevents the congestion from spreading, and recovers the entire network from a congested state. To do this, a free space estimation portion of the apparatus provided for the network estimates the free space of buffer provided for the apparatus based on the current free space, the maximum amount of data from an upstream node, and the amount of data supplied to a downstream node.

The network system disclosed in Japanese Unexamined Patent Application Publication No. 2010-028185 accurately detects congestion of user data. To do this, a control portion of the apparatus provided for the network functions based on a congestion state confirmation signal received by a reception portion of the apparatus and determines whether user data is congested on a route for carrying the user data.

SUMMARY OF THE INVENTION

A network provided with multiple network apparatuses needs to take into consideration not only the congestion in each of network apparatuses but also the congestion in the entire network in order to restrain the traffic from congesting in each of network apparatuses. The congestion occurring in one network apparatus needs to be controlled so as to minimize its influence on the traffic that is passed to other network apparatuses. For this purpose, it is necessary to take into consideration the link for the entire network and control a band of only the traffic that relates to the congestion and may affect the other traffics. However, the band control and the congestion control according to the conventional technologies do not take the link for the entire network into consideration.

The priority control as one of QoS controls needs to be taken into consideration in order to provide the same network with communication at different service levels. However, the conventional technologies do not take the priority as the QoS control into consideration.

A minimum bandwidth needs to be taken into consideration in order to ensure a given level of bands and minimize an effect of congestion. However, the conventional technologies do not take the minimum bandwidth into consideration.

The band control in consideration of these needs to analyze not only the traffic in one network apparatus but also the traffic in the entire network and compute a bandwidth based on the analysis result. However, too many elements need to be analyzed in order to analyze all the traffics in the entire network. A considerable burden is placed on the processor (including the CPU) and the memory of a control server that analyzes the traffic.

It is an object of the invention to extract only the traffic that relates to congestion and may affect other traffics in consideration of the entire network. It is another object of the invention to control a band for the extracted traffic and prevent the extracted traffic from affecting the other traffics without burdening a processor and memory.

A representative example of the present invention provides a transport control server connected to multiple nodes through which multiple traffics pass. The transport control server receives information about a bandwidth from the nodes when the traffics pass through the nodes. The transport control server extracts a bandwidth for the traffic at an entry node and a bandwidth for the traffic at an exit node from the received bandwidth information. The traffic first passes through the entry node and last passes through the exit node. The transport control server functions based on the extracted bandwidth for the traffic at the entry node and the extracted bandwidth for the traffic at the exit node and calculates a bandwidth that is provided for the traffic and is dropped while the traffic passes through the nodes. The transport control server compares the calculated dropped bandwidth for the traffic with a specified first bandwidth and extracts one or more first traffics provided with the calculated dropped bandwidth larger than the first bandwidth. The transport control server functions based on the received band information and extracts a second traffic from the extracted first traffic. The second traffic has a bandwidth that is dropped at the two or more nodes for the first traffic to pass through and exceeds a specified second bandwidth.

An aspect of the invention can extract only traffic that relates to congestion and may affect other traffics. The embodiment can control a band without burdening a processor and memory of a control server.

BRIEF DESCRIPTION OF THE DRAWINGS

FIG. 5 is an explanatory diagram illustrating a traffic information table according to the first embodiment of the invention;

FIG. 6 is an explanatory diagram illustrating a node bandwidth information table according to the first embodiment of the invention;

FIG. 8 is an explanatory diagram illustrating a node route information table according to the first embodiment of the invention;

DETAILED DESCRIPTION OF THE PREFERRED EMBODIMENTS

The network system according to embodiments of the invention will be described in further detail with reference to the accompanying drawings.

First Embodiment

Figure 1:
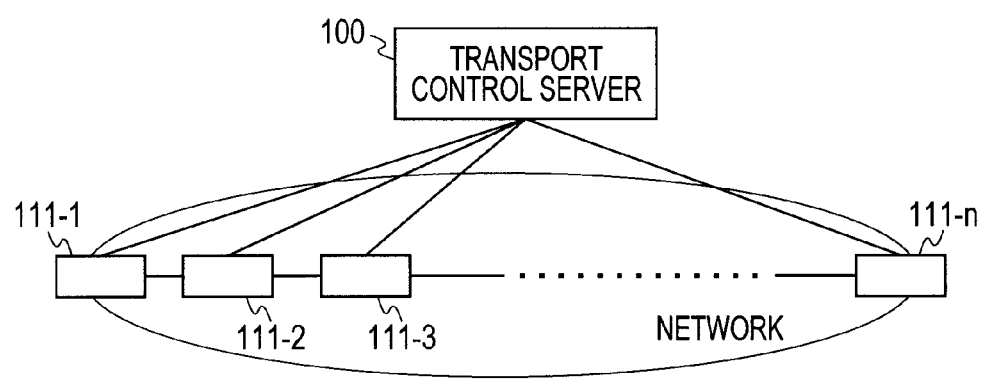
FIG. 1 is a block diagram illustrating a configuration of a network system according to a first embodiment of the invention.

FIG. 1 is a block diagram illustrating a configuration of a network system according to the first embodiment of the invention.

The network system according to the first embodiment includes a transport control server 100 and a node 111 (nodes 111-1 through 111-n). A network used for the network system includes multiple network apparatuses for WAN or Internet. The network according to the embodiment may be virtually implemented.

The transport control server 100 is equivalent to a computer that controls traffics passing through the network. The transport control server 100 includes a management terminal that provides a manager with means for screen display and system operations.

The transport control server 100 is connected to multiple nodes 111. The transport control server 100 specifies a path (route) for connection between the nodes 111. Path specification technologies include MPLS (Multi-Protocol Label Switching), MPLS-TP (MPLS Transport Profile), and PBB-TE (Provider Backbone Bridge Traffic Engineering), for example. Paths for connecting the nodes 111 are specified in accordance with services such as VPN, audio, and video maintained in the nodes 111.

The node 111 is equivalent to a network apparatus managed by the transport control server 100. That is, the node 111 is provided as a network apparatus such as a router or a switch that selects a route for the traffic based on MPLS. The node 111 according to the embodiment may be provided as a virtually implemented switch, for example.

The transport control system according to the embodiment controls a band for the traffic passing through the network by supplying the node 11 with the amount of traffic transmitted from the other nodes 111.

The transport control server 100 according to the embodiment controls a specific traffic in consideration of not only a band for the specific traffic at the entry and the exit of the network but also a band for the other traffics that passes along with the specific traffic through the node 111 or a link the specific traffic passes through. The transport control server 100 also takes into consideration a predetermined bandwidth for each node 111 or traffic.

Figure 2:
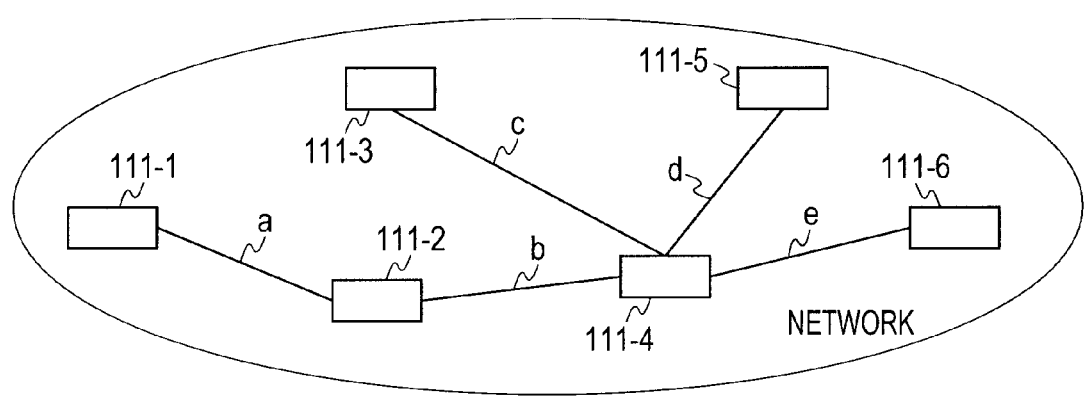
FIG. 2 is an explanatory diagram illustrating an example of traffic control according to the first embodiment of the invention.

FIG. 2 is an explanatory diagram illustrating an example of traffic control according to the first embodiment of the invention.

The network in FIG. 2 includes the nodes 111-1 through 111-6 according to the first embodiment of the invention. Links a through d connect the nodes 111 with each other. The link a connects the node 111-1 with the node 111-2. The link b connects the node 111-2 with the node 111-4. The link c connects the node 111-3 with the node 111-4. The link d connects the node 111-4 with the node 111-5. The link e connects the node 111-4 with the node 111-6.

For example, the network in FIG. 2 provides high band usage rates or loss rates at the links b and d. The link b indicates an excess band of 50 Mbps. The link d indicates an excess band of 10 Mbps. The other links indicate low band usage rates or loss rates. The excess band signifies a band for available traffic in consideration of the other traffics.

Traffics 1 and 2 pass through the network shown in FIG. 2. The traffic 1 enters the network from the node 111-1 and exists from the network from the node 111-5. The nodes 111-1 and 111-5 are edge nodes, i.e., edges of the traffic 1.

The traffic 1 passes through the nodes 111-2 and 111-4. The traffic 1 enters the node 111-1 at 500 Mbps. The traffic 1 exists from the node 111-5 at 10 Mbps.

The traffic 2 enters the network from the node 111-1 and exits from the network from the node 111-6. The nodes 111-1 and 111-6 are edge nodes for the traffic 2.

The traffic 2 passes through the nodes 111-2 and 111-4. The traffic 2 enters the node 111-1 at 40 Mbps. The traffic 2 exists from the node 111-6 at 4 Mbps.

According to the example network in FIG. 2, the node 111-4 limits the band for the traffic 1 because the link d connected to the node 111-5 allows for a small excess band (10 Mbps). Accordingly, the traffic 1 flows from the edge node to the edge node (end-to-end) only at 10 Mbps.

The node 111-2 tries to allow the 500 Mbps traffic 1 to flow through the link b through which the traffic passes in the network. As a result, the link b exhausts the excess band. Because of this, the node 111-2 controls the band for the traffic 2 as well as the band for the traffic 1.

The traffic 2 is reduced from 40 Mbps to 4 Mbps due to an influence from the traffic 1 even though sufficient bands are available from the links a and e connecting from the nodes 111-1 to 111-6.

The traffic 1 needs to be controlled to pass through the links a and b at a band approximate to 10 Mbps capable of end-to-end flow in order to ensure the excess band at the link b and minimize an influence of the traffic 1 on the traffic 2. The node 111-1 needs to previously adjust the band for the traffic 1 to the band at the node 111-5 in order to minimize an influence of the traffic 1 on the other traffics.

The traffic 1 can use the 10 Mbps band, i.e., the band before the control capable of end-to-end flow when the node 111-1 controls the traffic 1 as described above. The link b still reserves the 40 Mbps excess band in addition to the 10 Mbps band for the traffic 1. Accordingly, the traffic 2 can pass through the network at the 40 Mbps band end-to-end without losing packets contained in the traffic 2 at the node 111-2.

As described above, the traffic 1 affects the band for the traffic 2. Two nodes 111, the nodes 111-2 and 111-4, reduce the band for the traffic 1. The transport control server 100 according to the first embodiment controls the band for traffic that reduces a large band during an end-to-end flow and loses packets contained in the band at two or more nodes 111.

Figure 3:
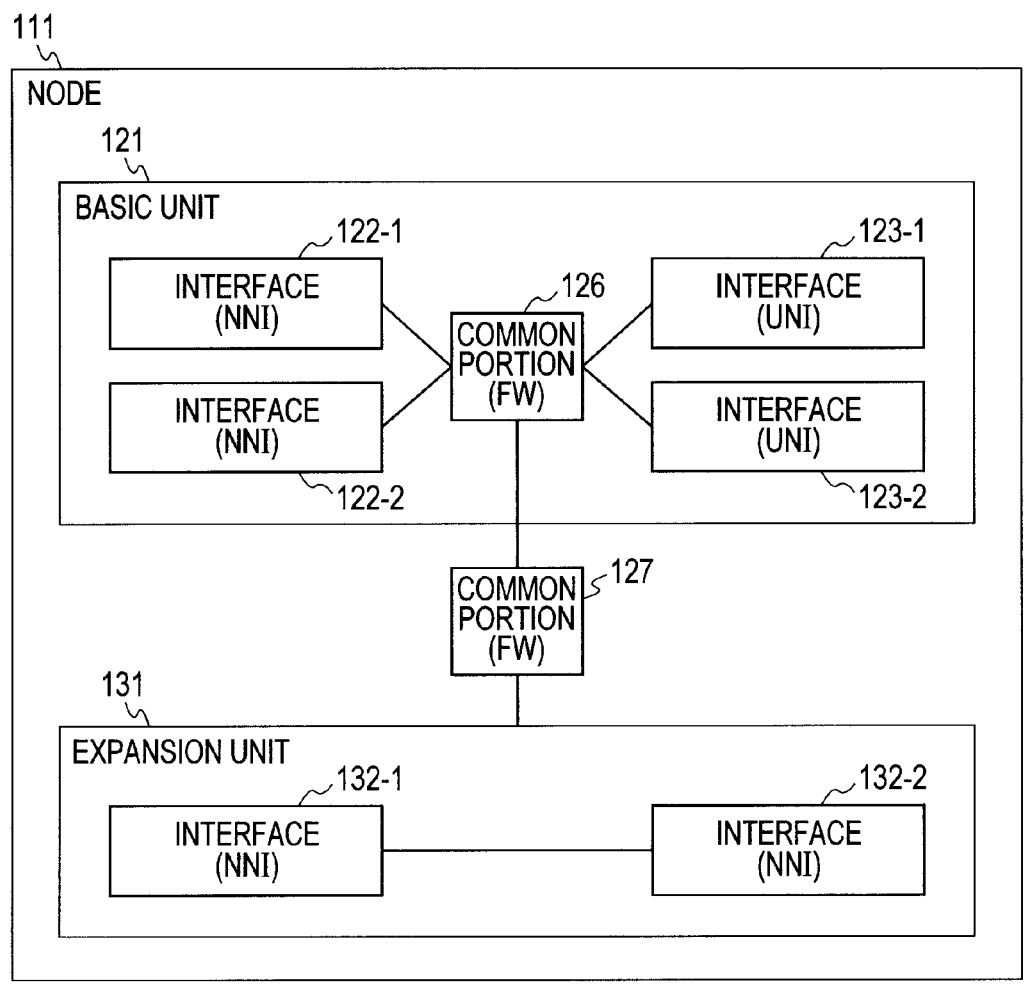
FIG. 3 is a block diagram illustrating a logical node configuration according to the first embodiment of the invention.

FIG. 3 is a block diagram illustrating a configuration of the node 111 according to the first embodiment of the invention.

As described above, the node 111 is equivalent to a network apparatus that selects a route for the traffic across the network. The node 111 is provided with a processor (including a CPU) and memory. The processor performs functions of the node 111 by loading the functions into the memory.

The node 111 receives the traffic through links connected to the node 111 and calculates a band for the traffic at the link to which the traffic is transmitted next. The node 111 then uses the calculated band to maintain the function that transmits the traffic to the next link. The node 111 includes a basic unit 121, an expansion unit 131, and a common portion 127 connecting these.

The basic unit 121 is provided for the node 111 by default. The basic unit 121 receives the traffic transmitted from the other node 111 via links and transmits the traffic to the other node 111 via links. The basic unit 121 includes an interface 122 (122-1 and 122-2), an interface 123 (123-1 and 123-2), and a common portion 126.

The common portion 126 is equivalent to switching fabric (FW) that connects the interface 122 with the interface 123. The interfaces 122 and 123 receive traffic and each have one or more ports. The interface 122 is provided as an NNI (Network Network Interface), for example. The interface 123 is provided as a UNI (User Network Interface), for example.

The node 111 receives the traffic. A port provided for the interface 122 or 123 then receives the traffic. The common portion 126 lets the traffic to pass. A port provided for the other interface 122 or 123 transmits the traffic. The interfaces 122 and 123 and the common portion 126 depend on the traffic. The interfaces 122 and 123 and the common portion 126 each maintain available traffic bands.

The expansion unit 131 is added to the node 111 as needed. The expansion unit 131 includes an interface 132 (132-1 and 132-2). The interface 132 is equivalent to the interface 122 or 123 and is provided as an NNI, for example An excess band for the node 111 corresponding to each traffic is calculated based on packet processing speeds and buffer sizes in such components as the interfaces 122 and 123 and the common portion 126 where the traffic passes. Settling the interfaces 122 and 123 for the traffic uniquely determines a link where the traffic passes. Calculating an excess band finds an excess band for the node.

Figure 4:
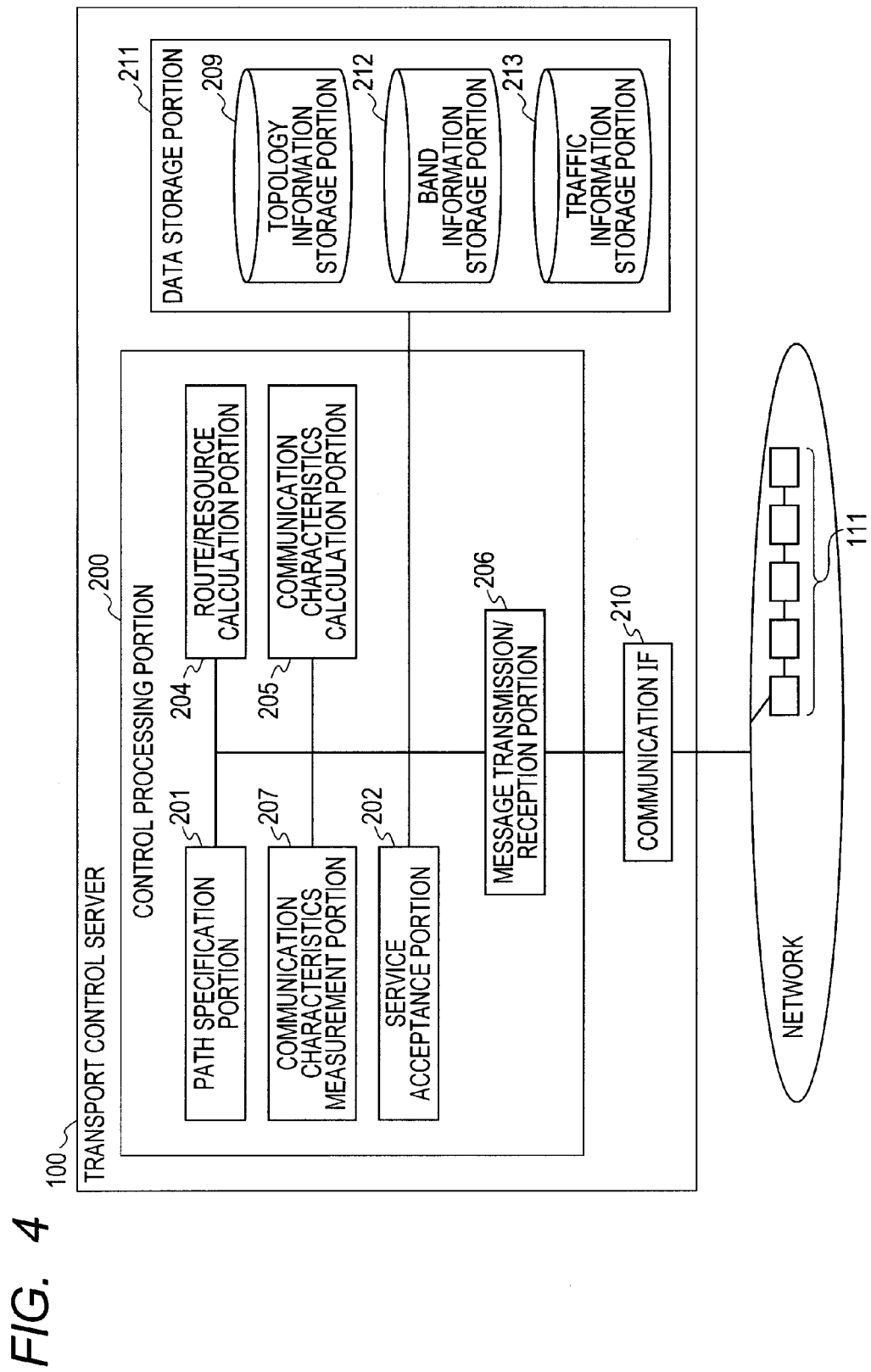
FIG. 4 is a block diagram illustrating a configuration of a transport control server according to the first embodiment of the invention.

FIG. 4 is a block diagram illustrating a configuration of the transport control server 100 according to the first embodiment of the invention.

The transport control server 100 is equivalent to a computer that supplies a traffic band to the node 111. The transport control server 100 includes a communication IF (interface) 210, a data storage portion 211, and a control processing portion 200. As a computer, the transport control server 100 includes a processor, a volatile storage device (e.g., memory), and a nonvolatile storage device (e.g., hard disk drive).

The communication IF 210 provides, removes, or changes a path for the node 111 directly or through an EMS (Element Management System). The communication IF 210 transmits a message to the node 111 while the message contains an instruction to transmit information maintained in the node 111. The communication IF 210 receives a message containing information from the node 111.

The control processing portion 200 references or updates values in the data storage portion 211. The data storage portion 211 is included in a nonvolatile storage device provided for the transport control server 100. The data storage portion 211 includes a topology information storage portion 209, a band information storage portion 212, and a traffic information storage portion 213.

The topology information storage portion 209 stores information about links connected to the nodes 111 and information about the other nodes 111. The topology information storage portion 209 contains a topology information table 530 to be described later.

The band information storage portion 212 stores information about components of the nodes 111. The band information storage portion 212 contains a node bandwidth information table 520 and a node route information table 540 to be described later.

The traffic information storage portion 213 stores information about traffics in the network. The traffic information storage portion 213 contains a traffic information table 500 to be described later.

The control processing portion 200 references values stored in the data storage portion 211, calculates traffic bands, and supplies calculated traffic nodes to the node 111. The control processing portion 200 includes a path specification portion 201, a service acceptance portion 202, a route/resource calculation portion 204, a communication characteristics calculation portion 205, a communication characteristics measurement portion 207, and a message transmission/reception portion 206 as functions. To implement the functions contained in the control processing portion 200, programs are maintained in the nonvolatile storage device provided for the transport control server 100. The processor executes these programs in the volatile storage device.

The path specification portion 201 generates data for specifying traffic data based on the information about traffic bands. The route/resource calculation portion 204 calculates traffic bands indicated by the information the path specification portion 201 uses.

The route/resource calculation portion 204 calculates a traffic band and stores the calculated traffic band in the data storage portion 211. The route/resource calculation portion 204 calculates a band for the traffic that is extracted by the communication characteristics calculation portion 205.

The communication characteristics calculation portion 205 uses traffic band information at the entry and the exit and band usage rates and loss rates of the links to extract the traffic whose band is to be calculated. The communication characteristics measurement portion 207 measures band information about the traffic used by the communication characteristics calculation portion 205.

The communication characteristics measurement portion 207 measures bands at edge nodes for the traffic passing through the network and band usage rates and loss rates of the links.

The service acceptance portion 202 displays a traffic band through the GUI of a management terminal connected to the transport control server 100. The service acceptance portion 202 may display a traffic band when the path specification portion 201 generates data for specifying the band and a network manager requests to display information about the band control. When limiting a band controls the band for traffic, the service acceptance portion 202 may display information about that traffic and the limited band.

The message transmission/reception portion 206 generates a message for specifying, changing, or deleting a path for the traffic based on data generated by the path specification portion 201 and transmits the message to the node 111 via the communication IF 210.

The message transmission/reception portion 206 interprets a message concerning information about the node 111 when the communication IF collects the message from the node 111. The message transmission/reception portion 206 transmits the message to the route/resource calculation portion 204 or the communication characteristics calculation portion 205.

The transport control server 100 calculates a band usage rate and a loss rate for each of the components included in the node 111. Accordingly, the transport control server 100 can accurately calculate a loss rate in accordance with implementation situations of the node 111 even if no band usage rate or no loss rate is measured at the node 111 on a traffic basis.

The node 111 is applicable to a virtual network. For this purpose, the node 111 is recognized as multiple virtual nodes belonging to multiple virtual networks. Resources for the node 111 are divided into the virtual networks. Further, bands can be limited by reflecting different policies on virtual networks. To do this, a traffic is extracted in consideration of resources for each virtual network. A band to limit the extracted traffic is calculated. Furthermore, resources provided for the node can be divided into virtual networks by calculating virtual network bands in units of components of the node 111. As a result, the traffic can be analyzed highly reliably. The corresponding maximum bandwidth can be calculated.

The following describes tables maintained in the data storage portion 211.

FIG. 5 is an explanatory diagram illustrating the traffic information table 500 according to the first embodiment of the invention.

The traffic information table 500 is stored in the traffic information storage portion 213. The traffic information table 500 contains a traffic ID 501, a virtual NWID 502, an edge node ID 503, a minimum bandwidth 504, a transit node ID 505, a transit link ID 506, a measurement band 507, an overflow flag 508, a band control state 513, a maximum bandwidth 509, an average difference band 510, a burst difference bandwidth 511, and a limit difference band 512.

The traffic ID 501 uniquely identifies each traffic passing through the network. The virtual NWID 502 uniquely identifies a virtual network installed in the network.

No virtual network may be installed in the network according to the embodiment. The virtual NWID 502 and virtual NWIDs 523 and 542 (to be described) are unneeded when no virtual network is installed.

The edge node ID 503 uniquely identifies an entry edge node, i.e., an edge node at which the traffic enters the network, and an exit edge node, i.e., an edge node at which the traffic exits from the network.

Each node 111 must ensure at least the minimum bandwidth 504 (Mbps or Gbps) for each traffic. The traffic is controlled not to pass through the network at a band smaller than the minimum bandwidth 504.

The minimum bandwidth 504 allows the transport control server 100 according to the embodiment to ensure a band corresponding to the minimum bandwidth 504 for each traffic. The transport control server 100 can calculate the maximum bandwidth 509 for the traffic to be controlled.

The transit node ID 505 uniquely identifies the node 111 through which the traffic passes in the network. The transit node ID 505 in FIG. 5 stores identifiers for all the nodes 111, including the node 111 corresponding to the edge node ID 503, through which the traffic passes in the network.

Using the transit node ID 505, the transport control server 100 according to the embodiment can extract a traffic to be controlled in consideration of traffic routes. The transport control server 100 can calculate a bandwidth (controlled available band 529 to be described) at each of the nodes 111 after the traffic is controlled.

The transit link ID 506 identifies a link through which the traffic passes. Using the transit link ID 506, the transport control server 100 according to the embodiment can extract a traffic to be controlled in consideration of which route corresponding to the transit node ID 505 is used for the traffic to pass. The transport control server 100 can calculate the maximum bandwidth 509.

The manager previously places values in the traffic ID 501, the virtual NWID 502, the edge node ID 503, the minimum bandwidth 504, the transit node ID 505, and the transit link ID 506.

Values may be stored in the transit node ID 505 and the transit link ID 506 in the order the traffic passes through the nodes 111 or links. This means that values may be stored in accordance with a sequence of the passing traffic so that the transport control server 100 can identify the sequence. The values may be supplied with sequential codes indicating the sequence of the passing traffic.

The measurement band 507 indicates bands for the traffic at the exit edge node and the entry edge node. The transport control server 100 according to the embodiment can calculate not only a traffic band but also a traffic loss rate by measuring both bands at the entry edge node and the exit edge node. The transport control server 100 can extract a traffic to be controlled in consideration of the loss rate.

The overflow flag 508 identifies whether the traffic shows a large difference in bands measured at the entry edge node and the exit edge node and passes through the link provided with a high band usage rate or loss rate more than once.

The overflow flag 508 set to Yes indicates that the embodiment controls the traffic indicated by the corresponding traffic ID 501. The transport control server 100 generates an instruction that controls the band of the traffic indicated by the corresponding traffic ID 501 at the entry edge node.

The overflow flag 508 set to No indicates that the embodiment does not control the traffic indicated by the corresponding traffic ID 501.

The band control state 513 is a flag indicating whether the traffic band is controlled at the entry edge node. That is, the flag indicates whether the band control according to the embodiment is applied to the traffic.

The band control state 513 set to OFF indicates that the band control is not applied to the traffic indicated by the corresponding traffic ID 501 at the entry edge node. The band control state 513 set to ON indicates that the band control is applied to the traffic indicated by the corresponding traffic ID 501 at the entry edge node.

The transport control server 100 can use the overflow flag 508 and the band control state 513 to maintain up-to-date information about the overflow flag 508 in accordance with network situations. This is true even when the band control takes a long time or even when a cycle for determining whether the embodiment controls the traffic differs from a cycle for controlling the traffic band.

The maximum bandwidth 509 indicates a bandwidth that limits the traffic to be controlled at the entry edge node. The transport control server 100 limits the traffic block diagram at the entry edge node to the bandwidth indicated by the maximum bandwidth 509.

The average difference band 510 indicates an average time equivalent to a difference in traffic bands at the entry edge node and the exit edge node.

The burst difference bandwidth 511 indicates a maximum difference between the band at the entry edge node and the band at the exit edge node for the traffic within a specified time period. The transport control server 100 can use the average difference band 510 and the burst difference bandwidth 511 to more accurately calculate a value to be stored in the maximum bandwidth 509.

The limit difference band 512 determines whether the band control is applied to the traffic. The transport control server 100 determines whether to apply the band control to the traffic by comparing a difference in traffic bands at the entry edge node and the exit edge node with the limit difference band 512.

The transport control server 100 determines that the traffic is dropped too much in the network when a difference between bands stored in the measurement band 507 for the entry edge node and the exit edge node exceeds the limit difference band 512. The manager previously stores a value in the limit difference band 512.

The transport control server 100 can flexibly provide the band control for each traffic by managing the limit difference band 512 for each traffic. The transport control server 100 can control QoS of each traffic by assuming the limit difference band 512 to be the lower limit of a bandwidth to be dropped.

The transport control server 100 can control bands for each virtual NW by managing the limit difference band 512 on the basis of the virtual NWID 502.

FIG. 6 is an explanatory diagram illustrating the node bandwidth information table 520 according to the first embodiment of the invention.

The node bandwidth information table 520 is maintained in the topology information storage portion 209. The node bandwidth information table 520 contains a node ID 521, a configuration portion 522, a virtual NWID 523, a processing speed 524, a bandwidth utilization rate 525, a loss rate 526, an available band 527, a controlled available band 529, a target bandwidth utilization rate 5201, and a target loss rate 5202. The node bandwidth information table 520 makes it possible to accurately extract a traffic to be controlled based on the loss rate 526 for each component.

According to the embodiment, the node 111 does not measure traffic loss rates for routes corresponding to the nodes 111. Using the node bandwidth information table 520, the transport control server 100 can calculate traffic loss rates for routes corresponding to the nodes 111.

The node ID 521 uniquely identifies the node 111. Values stored in the edge node ID 503 and the transit node ID 505 shown in FIG. 5 are equivalent to those stored in the node ID 521.

The configuration portion 522 uniquely identify components provided for the node 111. For example, values stored in the configuration portion 522 correspond to the ports provided for the interfaces 122, 123, and 132, and the common portions 126 and 127 shown in FIG. 3.

For example, the configuration portion 522 stores value "port 1" when identifier "1" is given to one of ports provided for the interface 122 of the node 111. The configuration portion 522 stores value "common 1" when identifier "common 1" is given to the common portion 126 of the node 111.

The virtual NWID 523 uniquely identifies a virtual network that includes the node 111. The virtual NWID 523 is equivalent to a value of the virtual NWID 502 shown in FIG. 5.

The node 111 can be provided with a virtual network for each route in each node 111. Components of each node 111 can be virtually divided. Values can be stored in the processing speed 524, the bandwidth utilization rate 525, the loss rate 526, the available band 527, the controlled available band 529, the target bandwidth utilization rate 5201, and the target loss rate 5202 corresponding to the virtual networks.

The virtual NWID 523 may be deleted when no virtual network is allocated to node 111.

The processing speed 524 indicates a bandwidth for one or more traffics that can be processed in each component. Multiple traffics may be processed in each component. The manager previously stores a value in the processing speed 524.

The bandwidth utilization rate 525 indicates a ratio of the available band 527 to the processing speed 524 of each component. In other words, the bandwidth utilization rate 525 indicates a bandwidth of one or more traffics passing through each component with reference to a bandwidth each component can process. The loss rate 526 indicates a ratio at which packets contained in the traffic are dropped in each component.

The available band 527 is equivalent to a bandwidth for the traffic that passes through a component indicated by the configuration portion 522. The available band 527 may contain a real-time traffic bandwidth, an hourly-averaged traffic bandwidth, or a maximum traffic bandwidth within a specified time period.

The controlled available band 529 indicates an available band when the value of the maximum bandwidth 509 calculated in accordance with the embodiment limits the traffic band at the entry edge node.

The target bandwidth utilization rate 5201 indicates a ratio of available bands for the traffic targeted by each component. The manager previously stores a value in the target bandwidth utilization rate 5201. Too heavy traffic is assumed to pass through the component indicated by the configuration portion 522 when the bandwidth utilization rate 525 is greater than the target bandwidth utilization rate 5201 on the corresponding row.

The target loss rate 5202 is assumed when a value of the target bandwidth utilization rate 5201 controls the traffic band. The manager previously stores a value in the target loss rate 5202 as well as the target bandwidth utilization rate 5201.

The loss rate 526 or the controlled available band 529 can be calculated for each component when the target bandwidth utilization rate 5201 and the target loss rate 5202 are managed in accordance with the virtual NWID 523 or the configuration portion 522 for each node 111. The transport control server 100 can finely control traffic bands.

Figure 7:
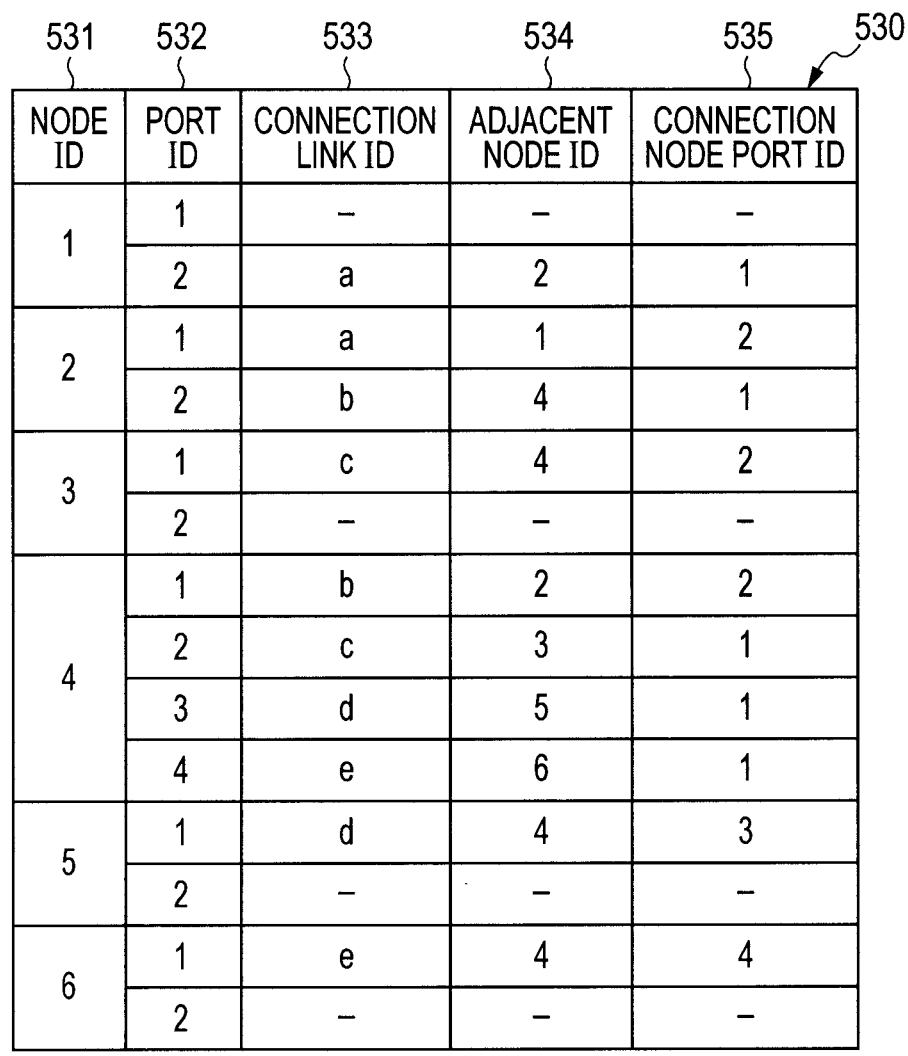
FIG. 7 is an explanatory diagram illustrating a topology information table according to the first embodiment of the invention.

FIG. 7 is an explanatory diagram illustrating the topology information table 530 according to the first embodiment of the invention.

The topology information table 530 is maintained in the topology information storage portion 209. The topology information table 530 contains a node ID 531, a port ID 532, a connection link ID 533, an adjacent node ID 534, and a connection node port ID 535.

The node ID 531 uniquely identifies the node 111. The node ID 531 is equivalent to a value specified for the node ID 521 shown in FIG. 6 and the edge node ID 503 and the transit node ID 505 shown in FIG. 5.

The port ID 532 uniquely identifies a port provided for the node 111 indicated by the node ID 531. A value of the port ID 532 is equivalent to a value of the configuration portion 522 shown in FIG. 6.

The connection link ID 533 uniquely identifies a link connected to the port indicated by the port ID 532. A value of the connection link ID 533 is equivalent to a value of the transit link ID 506 shown in FIG. 5.

The adjacent node ID 534 indicates the node 111 that is connected to the node ID 531 on the corresponding row via the connection link ID 533 on the corresponding row. A value of the adjacent node ID 534 is equivalent to a value of the node ID 531, the node ID 521 shown in FIG. 6, and the edge node ID 503 and the transit node ID 505 shown in FIG. 5.

The connection node port ID 535 uniquely identifies a port that is provided for the node 111 indicated by the adjacent node ID 534 on the corresponding row and is connected to the connection link ID 533 on the corresponding row. A value of the connection node port ID 535 is equivalent to a value of the port ID 532 and the configuration portion 522 shown in FIG. 6.

The topology information table 530 shown in FIG. 7 is equivalent to the topology of the network including the nodes 111-1 through 111-6 and the links a through e shown in FIG. 2.

FIG. 8 is an explanatory diagram illustrating the node route information table 540 according to the first embodiment of the invention.

The node route information table 540 is maintained in the band information storage portion 212. The node route information table 540 shows a loss rate for each combination of components through which the traffic passes in the node 111.

Using the node route information table 540, the transport control server 100 can extract a traffic loss rate corresponding to each route for the node 111 without recalculating loss rates for components included in each route. The node route information table 540 indicates a loss rate at which multiple traffics are dropped along the route for the node 111.

The node route information table 540 contains a node ID 541, a virtual NWID 542, a port ID 543, a transit configuration portion 544, a loss rate 545, a congestion flag 546, a control-target traffic ID 547, and a target loss rate 548.

The node ID 541 identifies the node 111. A value of the node ID 541 is equivalent to a value of the node ID 531 shown in FIG. 7, the node ID 521 shown in FIG. 6, and the edge node ID 503 and the transit node ID 505 shown in FIG. 5.

The virtual NWID 542 identifies a virtual network. A value of the virtual NWID 542 is equivalent to a value of the virtual NWID 523 shown in FIG. 6 and the virtual NWID 502 shown in FIG. 5. The virtual NWID 542 may be deleted when no virtual network is allocated to the node 111.

The port ID 543 identifies a port provided for the node 111. The port ID 543 is equivalent to the port ID 532 and the connection node port ID 535 shown in FIG. 7 The port ID 543 contains two port IDs. The first port ID indicates a port (entry port) where the traffic is input to the node 111. The second port ID indicates a port (exit port) where the traffic is output from the node 111.

The transit configuration portion 544 indicates a component for the traffic to pass between the entry port and the exit port indicated by the port ID 543 for the node 111. The transit configuration portion 544 is equivalent to the configuration portion 522 shown in FIG. 6.

A set of the port ID 543 and the transit configuration portion 544 indicates the route for the traffic to pass in each node 111.

The loss rate 545 is measured between the entry port and the exit port indicated by the port ID 543. The loss rate 545 is calculated by adding the loss rates 526 for the configuration portion 522 in FIG. 6 corresponding to the transit configuration portion 544 on the same row as the loss rate 545.

The congestion flag 546 stores a congestion state when a loss rate between the entry port and exit port indicated by the port ID 543 is greater than or equal to a predetermined threshold value. According to the embodiment, the congestion flag 546 stores "YES" to indicate a congestion state when the loss rate 545 exceeds the target loss rate 548. The congestion flag 546 stores "NO" to indicate no congestion state when the loss rate 545 does not exceed the target loss rate 548.

Using the congestion flag 546, the transport control server 100 can determine a congestion state during a time period longer than a time interval for updating the loss rate 545 even when the loss rate 545 is updated in a short time interval. It is possible to reduce loads on the processor and the memory provided for the transport control server 100 because a congestion state need not be determined in a short time interval.

The control-target traffic ID 547 identifies a traffic under control that passes between the entry port and the exit port indicated by the port ID 543 when the congestion flag 546 on the corresponding row indicates a congestion state. A value of the control-target traffic ID 547 is equivalent to a value of the traffic ID 501 shown in FIG. 5.

Using the control-target traffic ID 547, the transport control server 100 can fast extract a traffic whose band is to be controlled without rechecking the traffic to be controlled when the congestion flag 546 is updated. As a result, the transport control server 100 can control traffic bands.

The target loss rate 548 provides a target value for each route. The manager previously stores a value in the target loss rate 548. The transport control server 100 assumes a port to be congested when a value of the loss rate 545 exceeds the value of the target loss rate 548. The port assumed to be congested is indicated by the port ID 543 of the virtual NWID 542 of the node ID 541 on the same row as the target loss rate 548. The target loss rate 548 provides a threshold value to determine whether a route is congested.

The transport control server 100 can flexibly specify the target loss rate 548 in consideration of apparatuses provided for the node by managing the target loss rate 548 in accordance with the node ID 541, the virtual NWID 542, and the port ID 543.

Figure 9:
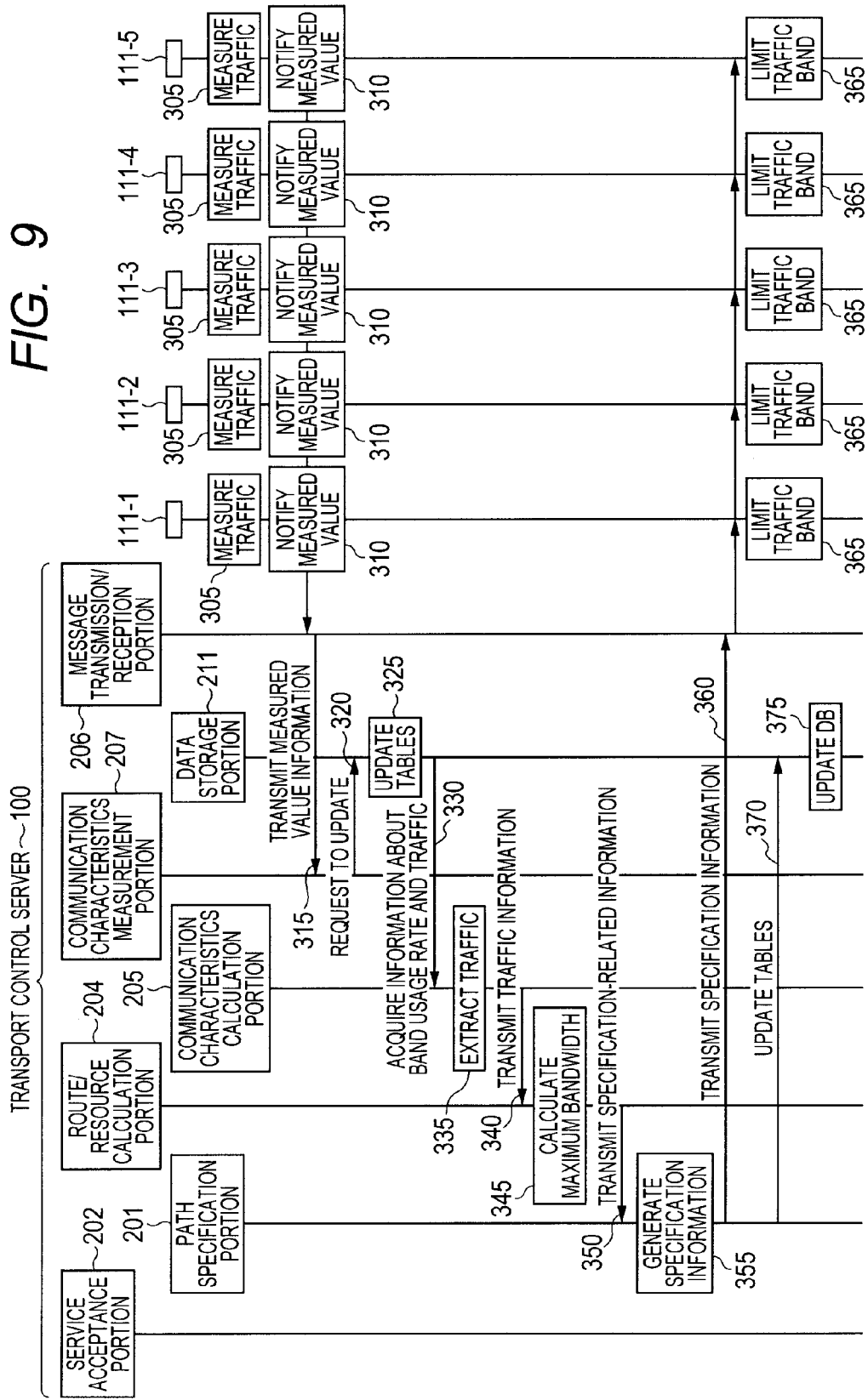
FIG. 9 is a sequence diagram illustrating a band control process according to the first embodiment of the invention in order to extract traffic for band control.

FIG. 9 is a sequence diagram illustrating a band control process according to the first embodiment of the invention in order to extract traffic for band control.

The process in FIG. 9 may start in accordance with an instruction from the transport control server or may start when any of the nodes 111 begins to congest. While FIG. 9 shows five nodes 111, one or more nodes 111 according to the embodiment may be used.

The node 111 may previously store the target loss rate 5202 in the node bandwidth information table 520. A congestion may be assumed when a loss rate for any component of the node 111 exceeds the target loss rate 5202.

At sequence 305, the nodes 111-1 through 111-5 measure bandwidths and loss rates for traffics passing through the nodes for each of the virtual networks and each of the components provided for the nodes 111. The node 111 as an edge node for each traffic measures a traffic band at the entry edge node and the exit edge node. Information measured at sequence 305 is hereafter referred to as measured value information.

At sequence 305, all traffic bands may not be measured because the traffics are heavy. In such a case, the node 111 extracts and measures only some major traffics. Only heavy traffics may be extracted.

At sequence 305, the node 111 may supply the measured value information with connection relation among the node 111 for each traffic to pass through, a link, and a component provided for the node 111.

At sequence 310, the nodes 111-1 through 111-5 transmit the measured value information acquired at sequence 305 to the message transmission/reception portion 206 of the transport control server 100. At sequence 315, the message transmission/reception portion 206 transmits the measured value information received from the node 111 to the communication characteristics measurement portion 207.

At sequence 320, the communication characteristics measurement portion 207 extracts values equivalent to the measurement band 507 in the traffic information table 500 and the bandwidth utilization rate 525 in the node bandwidth information table 520 from the measured value information received from the message transmission/reception portion 206. Based on the extracted values, the communication characteristics measurement portion 207 requests the data storage portion 211 to update the traffic information table 500 and the node bandwidth information table 520 maintained in the data storage portion 211.

When requesting the data storage portion 211 to update the tables, the communication characteristics measurement portion 207 may calculate the available band 527 by multiplying the processing speed 524 and the bandwidth utilization rate 525 together. The communication characteristics measurement portion 207 may request the data storage portion 211 to store the calculated available band 527.

At sequence 320, the communication characteristics measurement portion 207 may extract values equivalent to the edge node ID 503, the transit node ID 505, and the transit link ID 506 in the traffic information table 500, and the port ID 543 and the transit configuration portion 544 in the topology information table 530 and the node route information table 540 from the measured value information received from the message transmission/reception portion 206. Based on the extracted values, the communication characteristics measurement portion 207 may request the data storage portion 211 to update the traffic information table 500, the topology information table 530, and the node route information table 540.

At sequence 325, the data storage portion 211 receives the extracted values from the communication characteristics measurement portion 207. The data storage portion 211 then updates the traffic information table 500, the node bandwidth information table 520, the topology information table 530, and the node route information table 540.

At sequence 330, the communication characteristics calculation portion 205 references the data storage portion 211 and acquires the traffic information table 500, the node bandwidth information table 520, the node route information table 540, and the topology information table 530.

At sequence 335, the communication characteristics calculation portion 205 updates the overflow flag 508 in the traffic information table 500 and the loss rate 545, the congestion flag 546, and the control-target traffic ID 547 in the node route information table 540 based on the traffic information table 500, the node bandwidth information table 520, the topology information table 530, and the node route information table 540 acquired from the data storage portion 211.

The process at sequence 335 will be described in detail with reference to FIG. 10.

Figure 10:
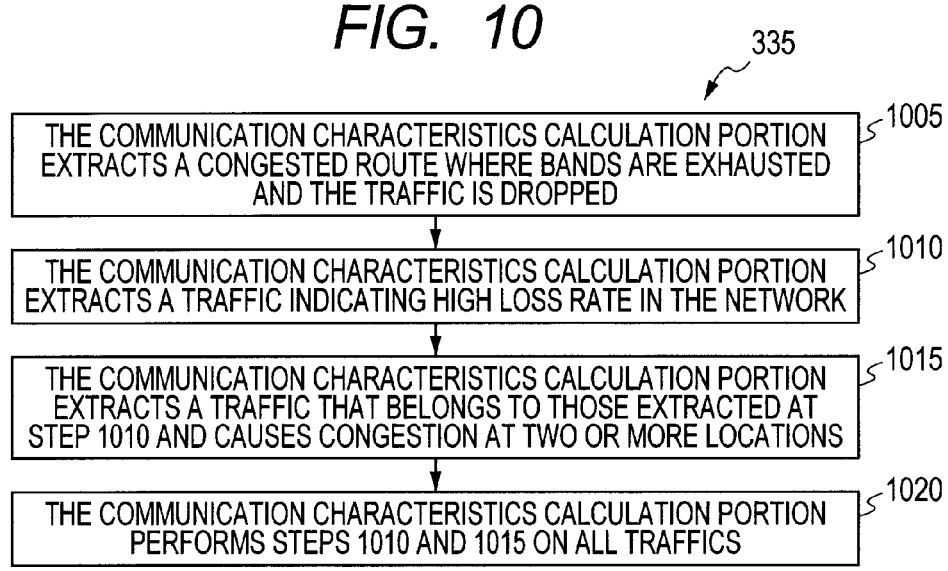
FIG. 10 is a flowchart illustrating a process of extracting traffic for band control according to the first embodiment of the invention.

FIG. 10 is a flowchart illustrating a process of extracting traffic for band control according to the first embodiment of the invention.

Step 1005

At step 1005, the communication characteristics calculation portion 205 extracts the node ID 541, the virtual NWID 542, and the transit configuration portion 544 each on a single row from the node route information table 540. The communication characteristics calculation portion 205 extracts, from the node bandwidth information table 520, a row containing the node ID 521, the configuration portion 522, and the virtual NWID 523 equivalent to the extracted node ID 541, the transit configuration portion 544, and the virtual NWID 542, and then extracts the loss rate 526 from the extracted row. In other words, the communication characteristics calculation portion 205 extracts the loss rate 526 for each component of each node 111.

The communication characteristics calculation portion 205 extracts the loss rates 526 corresponding to all identifiers when the extracted transit configuration portion 544 contains multiple identifiers. The communication characteristics calculation portion 205 calculates the loss rate 545 for each transit configuration portion 544 based on the extracted loss rate 526. Equation 1 below processes the extracted loss rate 526 to calculate the loss rate 544 for each transit configuration portion 544.

For example, equation 1 calculates loss rate P for each transit configuration portion 544, assuming the extracted loss rates 526 to be $\rho_1, \rho_2, \rho_3, \ldots,$ and $\rho_N$ ($0<\rho<1$).

$$P = 1 - (1-\rho_1)*(1-\rho_2)*(1-\rho_3)*(1-\rho_N) \quad \text{(Equation 1)}$$

The communication characteristics calculation portion 205 stores the calculated loss rate P in the loss rate 545 for each transit configuration portion 544 in the node route information table 540.

The communication characteristics calculation portion 205 compares the calculated loss rate 545 with the target loss rate 548 on the row corresponding to the calculated loss rate 545. The communication characteristics calculation portion 205 stores "YES" in the congestion flag 546 on the corresponding row when the loss rate 545 is higher than the target loss rate 548. As described above, storing "YES" in the congestion flag 546 indicates that the route indicated on the corresponding row is congested.

The communication characteristics calculation portion 205 stores "NO" in the congestion flag 546 on the corresponding row when the loss rate 545 is lower than the target loss rate 548. As described above, storing "NO" in the congestion flag 546 indicates that the route indicated on the corresponding row is not congested.

The communication characteristics calculation portion 205 uses the above-mentioned process at step 1005 to calculate the loss rates 545 on all rows in the node route information table 540 and stores the value in the congestion flag 546.

When the congestion flag 546 indicates a congestion state, bands are exhausted and the traffic is dropped on a route indicated by the port ID 543 and the transit configuration portion 544 on the corresponding row. That is, the route is a bottleneck because the congestion flag 546 shows it to be congested. At step 1005, the communication characteristics calculation portion 205 can extract a bottleneck route.

Step 1010

At step 1010 after step 1005, the communication characteristics calculation portion 205 extracts the measurement band 507 and the limit difference band 512 each on a single row in the traffic information table 500. The communication characteristics calculation portion 205 calculates the traffic dropped in the network by subtracting the traffic band contained in the measurement band 507 at the exit edge node from the traffic band contained in the extracted measurement band 507 at the entry edge node. The communication characteristics calculation portion 205 compares the amount of dropped traffic with the extracted limit difference band 512.

The row containing the extracted measurement band 507 indicates information about a high loss-rate traffic when a large amount of traffic is dropped in the network as a result of the comparison. Accordingly, the communication characteristics calculation portion 205 extracts the traffic ID 501 on the same row as that containing the extracted measurement band 507.

The communication characteristics calculation portion 205 processes all rows of the traffic information table 500 as described at step 1010. That is, at step 1010, the communication characteristics calculation portion 205 extracts a high loss-rate traffic that passes through the network.

At step 1010, the communication characteristics calculation portion 205 may use the average difference band 510 or the burst difference bandwidth 511 as the amount of dropped traffic when it is compared with the limit difference band 512. The communication characteristics measurement portion 207 of the transport control server 100 may calculate the average difference band 510 and the burst difference bandwidth 511 after the measured value information is received from the node 111.

Step 1015

At step 1015 after step 1010, the communication characteristics calculation portion 205 extracts the virtual NWID 502, the transit node ID 505, and the transit link ID 506 on the same row as that for the traffic ID 501 extracted at step 1010. The communication characteristics calculation portion 205 extracts, from the topology information table 530, a row containing the node ID 531 and the connection link ID 533 equivalent to the extracted transit node ID 505 and transit link ID 506 and extracts a set of the node ID 531 and the port ID 532.

That is, the communication characteristics calculation portion 205 extracts a set of the node 111, the link, and the port through which a high loss-rate traffic passes in the network.

Multiple sets of the node ID 531 and the port ID 532 are extracted when multiple values are stored in the extracted transit node ID 505 and transit link ID 506. Specifically, the extracted transit node ID 505 indicates an edge node when the transit node ID 505 indicates the same value as that contained in the edge node ID 503. In such a case, one port ID 532 is extracted corresponding to one node ID 531. Two port IDs 532 are extracted corresponding to one node ID when the edge node ID 503 contains no value for the transit node ID 505.

The communication characteristics calculation portion 205 extracts, from the node route information table 540, a row containing a set of the node ID 541 and the port ID 543 and the virtual NWID 542 equivalent to the extracted set of the node ID 531 and the port ID 532 and the extracted virtual NWID 502.

That is, the communication characteristics calculation portion 205 extracts a row from the node route information table 540 while the row indicates a route for the nodes 111 through which a high loss-rate traffic passes. Multiple rows may be extracted.

The communication characteristics calculation portion 205 references the congestion flag 546 for the extracted row. That is, the communication characteristics calculation portion 205 references the information indicating whether a congestion state occurs on the route in each node 111 for a high loss-rate traffic to pass through.

The communication characteristics calculation portion 205 also performs the above-mentioned process on all node IDs and link IDs contained in the transit node ID 505 and the transit link ID 506 on the same row as the traffic ID 501 extracted at step 1010. This makes it possible to reference all congestion flags 546 in the node route information table 540 concerning the traffic indicated by the traffic ID 501 extracted at step 1010.

Based on the reference result, the communication characteristics calculation portion 205 counts the number of congestion flags 546 that indicate "YES" concerning the traffic indicated by the traffic ID 501 extracted at step 1010.

While passing in the network, the traffic causes congestion on a route (i.e., a link) including two or more nodes 111 when the traffic is associated with two or more congestion flags 546 indicating "YES." The communication characteristics calculation portion 205 stores "YES" in the overflow flag 508 on the same row as the traffic ID 501 extracted at step 1010 from the traffic information table 500.

The communication characteristics calculation portion 205 stores "NO" in the overflow flag 508 when one traffic is associated with fewer than two congestion flags 546 indicating "YES." The communication characteristics calculation portion 205 can extract a traffic that indicates a high loss rate and causes congestion on a route for two or more nodes 111.

The communication characteristics calculation portion 205 extracts a row of the node route information table 540 containing a route for the node 111 through which the traffic indicated by the overflow flag 508 storing "YES" passes. The communication characteristics calculation portion 205 stores an identifier for that traffic in the control-target traffic ID 547 in the extracted row.

Specifically, the communication characteristics calculation portion 205 extracts the port ID 532 for the traffic to pass through based on the transit node ID 505, virtual NWID 502, and the transit link ID 506 from the row corresponding to the overflow flag 508 storing "YES" and the topology information table 530. The communication characteristics calculation portion 205 extracts a row of the node route information table 540 equivalent to the extracted port ID 532, transit node ID 505, and virtual NWID 502. The communication characteristics calculation portion 205 then stores the traffic ID 501 in the control-target traffic ID 547 in the extracted row.

As a result, the communication characteristics calculation portion 205 stores a traffic identifier in the control-target traffic ID 547 corresponding to all routes where two or more nodes 111 are included and the high loss-rate traffic passes and causes a congestion state.

Step 1020

At step 1020 after step 1015, the communication characteristics calculation portion 205 repeats the processes at steps 1010 and 1015 on all traffic IDs 510 stored in the traffic information table 500.

The communication characteristics calculation portion 205 need not perform the process shown in FIG. 10 on all traffics. The communication characteristics calculation portion 205 performs the processes at steps 1010 and 1015 once in several times on a traffic that allows the average difference band 510 to be much smaller than the limit difference band 512 in the traffic information table 500. The communication characteristics calculation portion 205 need not perform the processes each time sequence 355 is performed. Using the average difference band 510, the communication characteristics calculation portion 205 can reduce the number of traffics to be processed.

Using the process of sequence 335 shown in FIG. 10, the communication characteristics calculation portion 205 can extract a traffic whose band is to be calculated in the subsequent process.

At sequence 340 after sequence 335, the communication characteristics calculation portion 205 transmits the traffic information table 500, the node bandwidth information table 520, the topology information table 530, and the node route information table 540 updated at sequence 335 as the traffic information to the route/resource calculation portion 204.

At sequence 345, the route/resource calculation portion 204 references the traffic information table 500, the node bandwidth information table 520, the topology information table 530, and the node route information table 540 to calculate the maximum bandwidth 509 in the traffic information table 500.

The process at sequence 345 will be described in detail with reference to FIG. 11.

Figure 11:
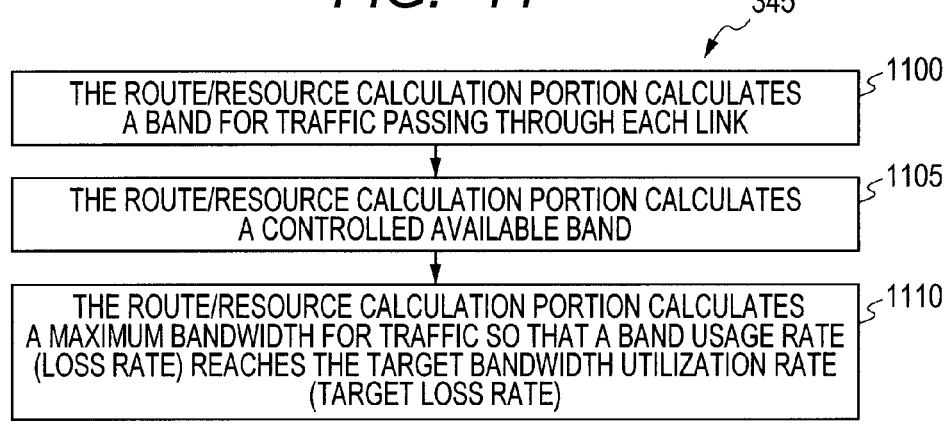
FIG. 11 is a flowchart illustrating a process of calculating a maximum bandwidth according to the first embodiment of the invention.

FIG. 11 is a flowchart illustrating a process of calculating the maximum bandwidth 509 according to the first embodiment of the invention.

Step 1100

At step 1100, the route/resource calculation portion 204 references the overflow flag 508 in the traffic information table 500. The route/resource calculation portion 204 extracts the traffic ID 501, the virtual NWID 502, the transit node ID 505, the transit link ID 506, and the measurement band 507 from the row where the overflow flag 508 stores "YES." That is, the route/resource calculation portion 204 extracts information about a high loss-rate traffic from the traffic information table 500 when the traffic passes through the network and causes congestion on a route for two or more nodes 111.

The route/resource calculation portion 204 extracts, from the topology information table 530, a row containing the node ID 531 and the connection link ID 533 equivalent to the extracted transit node ID 505 and transit link ID 506. The route/resource calculation portion 204 then extracts the port ID 532 in the extracted row. That is, the route/resource calculation portion 204 extracts the port through which the traffic passes in the network.

The route/resource calculation portion 204 extracts a row containing the node ID 541, the virtual NWID 542, and the port ID 543 equivalent to the extracted node ID 531 (transit node ID 505), virtual NWID 502, and port ID 532 and extracts the loss rate 545 in the extracted row. That is, the route/resource calculation portion 204 extracts the loss rate 545 on the route for the nodes 111 through which the traffic passes.

At step 1100, the route/resource calculation portion 204 calculates bands of the traffic passing through the links based on the extracted transit link ID 506, measurement band 507, and loss rate 545.

Each row of the node route information table 540 represents a route within each node 111. The route within each node 111 is connected to one link. Accordingly, a band for each link is calculated based on the band of the traffic at the entry edge node and the loss rate 545 for the route in each node through which the traffic passes.

For example, equation 2 calculates band $B_h$ of the traffic that enters the edge node of the network and passes through the h-hop link.

$$B_h = \pi^h_{i=1}(1-P_i)*B_{in} \qquad \text{(Equation 2)}$$

In equation 2, h denotes the hop count from the entry edge node to the link where the band is calculated. $P_i$ denotes the loss rate 545 for the route in each node 111 connected to the link with hop count i from the entry edge node. That is, $P_i$ denotes the loss rate for the route in the i-th node 111 for the traffic to pass through when the entry edge node is assumed to be the first one. $B_{in}$ denotes the band in the entry edge node. $\pi^h_{i=1}(X_i)$ denotes the product of $X_i$ from i=1 to i=h.

$P_i$ denotes the value of loss rate 545 in the node route information table 540. $B_{in}$ denotes the value of the measurement band 507 in the traffic information table 500.

The route/resource calculation portion 204 performs the above-mentioned process at step 1100 on all traffics corresponding to the overflow flag 508 storing "YES" in the traffic information table 500.

Step 1105

At step 1105, the route/resource calculation portion 204 extracts the traffic ID 501, the virtual NWID 502, the transit node ID 505, the transit link ID 506, and the measurement band 507 from the row corresponding to the overflow flag 508 storing "YES" in the traffic information table 500. That is, the route/resource calculation portion 204 extracts, from the traffic information table 500, the information about a high loss-rate traffic that passes through the network and causes a congestion state on the route for two or more nodes 111.

The route/resource calculation portion 204 extracts, from the topology information table 530, a row containing the node ID 531 and the connection link ID 533 equivalent to the extracted transit node ID 505 and transit link ID 506 and extracts the port ID 532 in the extracted row. That is, the route/resource calculation portion 204 extracts a port through which the traffic passes in the network.

The route/resource calculation portion 204 extracts, from the node route information table 540, a row containing the node ID 541, the virtual NWID 542, and the port ID 543 equivalent to the extracted transit node ID 531, virtual NWID 502, and port ID 532 and extracts the transit configuration portion 544 in the extracted row. That is, the route/resource calculation portion 204 extracts a route for two or more nodes 111 through which a high loss-rate traffic passes and causes a congestion state on the route included in the nodes 111.

As an alternative to the process at step 1105, the route/resource calculation portion 204 extracts the control-target traffic ID 547 on each row of the node route information table 540 as well as the node ID 541, the virtual NWID 542, and the transit configuration portion 544 on the corresponding row. The route/resource calculation portion 204 references the measurement band 507 on the row containing the same traffic ID 501 in the traffic information table 500 as the extracted control-target traffic ID 547. The transport control server 100 can reduce processes for many traffics to be controlled and conserve its processor and memory.

The route/resource calculation portion 204 extracts, from the node bandwidth information table 520, a row containing the node ID 521, the virtual NWID 523, and the configuration portion 522 equivalent to the extracted node ID 541, virtual NWID 542, port ID 543, and transit configuration portion 544 and extracts the available band 527 in the extracted row. That is, the route/resource calculation portion 204 extracts the available band 527 for a high loss-rate traffic that passes through the route for two or more nodes 111 and causes a congestion state on the route included in the nodes 111.

The route/resource calculation portion 204 subtracts the band (Bh) calculated at step 1100 for the traffic passing through the links from the available band 527 extracted by the process at step 1105. The route/resource calculation portion 204 adds the measurement band 507 at the exit edge node to the subtraction result. The route/resource calculation portion 204 stores the addition result in the controlled available band 529 corresponding to the available band 527 of the node bandwidth information table 520.

The following example assumes that a traffic is given the traffic ID 501 set to "1" (hereafter referred to as a traffic 1) and passes through the nodes 111-1, 111-2, 111-4, and 111-5 in the network as shown in FIG. 2. At step 1100, the route/resource calculation portion 204 calculates a band B2 for the traffic 1 on the link b (hop count "2" from the entry edge node) connected to the exit port of the node 111-2.

At step 1105, the route/resource calculation portion 204 subtracts the band B2 for the traffic 1 from the available band 527 for each configuration portion 522 of the node 111-2. The available band 527 contains bands for traffics other than the traffic 1. Using the band B2 for the traffic 1 on the link b, the route/resource calculation portion 204 can subtract only the band for the traffic 1 from the available band 527 for the configuration portion 522 of the node 111-2.

The route/resource calculation portion 204 adds the band for the traffic 1 at the node 111-6 as the exit edge node to a value found by subtracting the band B2 for the traffic 1 on the link b from the available band 527 for each configuration portion 522. The route/resource calculation portion 204 stores the added result in the controlled available band 529. As a result, each configuration portion 522 can maintain the band for the traffic 1 that exits from the exit edge node end-to-end in the network.

The route/resource calculation portion 204 performs the process at step 1105 on all traffics corresponding to the overflow flag 508 storing "YES" of the traffic information table 500 or all traffics contained in the control-target traffic ID 547 of the node route information table 540.

Step 1110

At step 1110 after step 1105, the route/resource calculation portion 204 extracts a row containing the controlled available band 529 updated at step 1105 from the node bandwidth information table 520. The route/resource calculation portion 204 extracts the available band 527, the controlled available band 529, and the target bandwidth utilization rate 5201 in the extracted row. That is, the route/resource calculation portion 204 extracts information about the components through which a high loss-rate traffic passes and causes a congestion state on the route for two or more nodes 111.

The route/resource calculation portion 204 compares the extracted controlled available band 529 with the target bandwidth utilization rate 5201 on the corresponding row. During the comparison, the route/resource calculation portion 204 calculates a target available band by multiplying the target bandwidth utilization rate 5201 and the processing speed 524 on the corresponding row together. The route/resource calculation portion 204 compares the controlled available band 529 with the calculated target available band.

A case where the controlled available band 529 is larger than the target available band indicated by the target bandwidth utilization rate 5201

Controlling the traffic band signifies that the traffic passes using a band larger than the target available band indicated by the target bandwidth utilization rate 5201. The route/resource calculation portion 204 extracts the node ID 521, the configuration portion 522, and the virtual NWID 523 on the corresponding row in order to approximate the traffic band to the target available band indicated by the target bandwidth utilization rate 5201.

When the traffic flows at the band indicated by the controlled available band 529, the route/resource calculation portion 204 extracts a component for the traffic to pass through at a band in excess of the target bandwidth utilization rate 5201 from the components for which the controlled available band 529 is updated.

The route/resource calculation portion 204 extracts a row containing the node ID 541 and the virtual NWID 542 equivalent to the extracted node ID 521 and virtual NWID 523 from the node route information table 540. Of the extracted rows, the route/resource calculation portion 204 further extracts a row containing the configuration portion 522 extracted for the transit configuration portion 544 as described above. The route/resource calculation portion 204 extracts the control-target traffic ID 547 contained in the extracted row. That is, the route/resource calculation portion 204 extracts the identifier of a traffic that passes through the configuration portion 522 provided with the controlled available band 529 higher than the target bandwidth utilization rate 5201, indicates a high loss rate, and causes a congestion state on the route for two or more nodes 111.

The route/resource calculation portion 204 extracts a row containing the traffic ID 501 equivalent to the extracted control-target traffic ID 547 from the traffic information table 500. The route/resource calculation portion 204 extracts the measurement band 507 at the exit edge node or the minimum bandwidth 504 contained in the extracted row whichever is less.

The route/resource calculation portion 204 stores the extracted less band in the maximum bandwidth 509. The route/resource calculation portion 204 compares the measurement band 507 at the exit edge node with the minimum bandwidth 504. The route/resource calculation portion 204 stores the smaller one in the maximum bandwidth 509 to be able to limit bands while ensuring the minimum bandwidth.

When extracting a less band, the route/resource calculation portion 204 may multiply the measurement band 507 for the exit edge node by a weight coefficient and store the multiplied result in the maximum bandwidth 509. The use of a weight coefficient greater than 1 enables the band limitation in consideration of a statistical multiplexing effect.

A case where the controlled available band 529 is less than the target available band indicated by the target bandwidth utilization rate 5201

The route/resource calculation portion 204 extracts the node ID 521, the configuration portion 522, and the virtual NWID 523 on the corresponding row. That is, the route/resource calculation portion 204 extracts the configuration portion 522 through which the traffic passes at an available band less than or equal to the target bandwidth utilization rate 5201 when the controlled available band 529 indicates the available band on the row corresponding to the updated controlled available band 529.

The extracted configuration portion 522 ensures a sufficient band because the traffic, when controlled, passes using a band lower than the target bandwidth utilization rate 5201. This makes it possible to increase bands for the other traffics passing through the extracted configuration portion 522.

The route/resource calculation portion 204 uses the following processes to extract other traffics capable of increasing bands and calculate a band that can be increased for the other extracted traffics.

The route/resource calculation portion 204 extracts, from the node route information table 540, one or more rows containing the node ID 541 and the virtual NWID 542 equivalent to the extracted node ID 521 and virtual NWID 523. Of the extracted rows, the route/resource calculation portion 204 extracts one or more rows containing the configuration portion 522 extracted for the port ID 543 or the transit configuration portion 544 and further extracts one or more control-target traffic IDs 547 contained in the extracted row.

The route/resource calculation portion 204 selects one or more rows extracted from the node route information table 540 so that the selected row differs from a row containing the extracted control-target traffic ID 547 and contains the congestion flag 546 storing "YES." The route/resource calculation portion 204 extracts, from the identifiers contained in the extracted control-target traffic ID 547, the control-target traffic ID 547 (hereafter referred to as a band-increasable traffic ID) storing a value other than the values stored in the control-target traffic ID 547 on the selected row. The route/resource calculation portion 204 then calculates the number of band-increasable traffic IDs.

Specifically, the following describes a case where the row corresponding to the updated controlled available band 529 contains the node ID 521 storing "1" (hereafter referred to as the node 111-1), the configuration portion 522 storing "common 1" as an identifier, and the virtual NWID 523 storing "1." The route/resource calculation portion 204 extracts a row of the node route information table 540. The row is equivalent to the row corresponding to the updated controlled available band 529 and contains and contains the node ID 541 storing "1" and the virtual NWID 542 storing "1." As a result, for example, the route/resource calculation portion 204 extracts rows 5401, 5402, and 5403 of the node route information table 540 shown in FIG. 8.

The route/resource calculation portion 204 further extracts values (1, 2, 3, 5, 8, and 11) of the extracted rows 5401, 5402, and 5403. Except the rows 5401, 5402, and 5403, the route/resource calculation portion 204 selects the row 5404 that contains the congestion flag 546 storing "YES." The route/resource calculation portion 204 extracts values (13 and 16) of the control-target traffic ID 547 from the row 5404.

The control-target traffic IDs 547 on the rows 5401, 5402, and 5403 store values "1", "2", "3", "5", "8", and "11" other than values (13 and 16) of the control-target traffic ID 547 on the row 5404. Accordingly, the route/resource calculation portion 204 assumes traffic IDs "1", "2", "3", "5", "8", and "11" to be band-increasable traffic IDs.

The route/resource calculation portion 204 extracts the target bandwidth utilization rate 5201 and the processing speed 524 from the row where the updated controlled available band 529 indicates a rate smaller than or equal to the target bandwidth utilization rate 5201. The route/resource calculation portion 204 multiplies the target bandwidth utilization rate 5201 by the processing speed 524 both extracted and subtracts the controlled available band 529 from the resulting product. The route/resource calculation portion 204 then divides the subtracted result by the number of band-increasable traffic IDs calculated above. The divided result is hereafter referred to as an increased band.

The route/resource calculation portion 204 extracts the measurement band 507 for the exit edge node from the row containing the traffic ID 501 equal to the band-increasable traffic ID and the minimum bandwidth 504 on the same row of the traffic information table 500. The route/resource calculation portion 204 adds the maximum bandwidth 509 on the same row, the measurement band 507 for the exit edge node, and the increased band together. The route/resource calculation portion 204 compares the added result with the minimum bandwidth 504 on the same row. As a comparison result, the route/resource calculation portion 204 stores the larger one in the maximum bandwidth 509.

As a comparison result, the controlled available band 529 may equal the target available band indicated by the target bandwidth utilization rate 5201. In such a case, the route/resource calculation portion 204 may store the band for the exit edge node in the maximum bandwidth 509.

At step 1110 described above, the route/resource calculation portion 204 stores the value of a band approximate to the target bandwidth utilization rate 5201 in the maximum bandwidth 509 so that the stored band can control the traffic. The route/resource calculation portion 204 stores a band larger than or equal to the minimum bandwidth 504 in the maximum bandwidth 509.

The route/resource calculation portion 204 may multiply the measurement band 507 for the exit edge node and the increased band each by a weight coefficient. The use of a weight coefficient smaller than 1 for the increased band allows some of traffics to pass through using a band larger than the currently available band. This makes it possible to reduce possibilities of exhausting bands for the other links (routes).

At step 1110 as described above, the route/resource calculation portion 204 compares the controlled available band 529 with the target bandwidth utilization rate 5201 by calculating the target available band indicated by the target bandwidth utilization rate 5201. The route/resource calculation portion 204 may compare a result of dividing the controlled available band 529 by the processing speed 524 with the target bandwidth utilization rate 5201.

At step 1110 described above, the controlled available band 529 and the target bandwidth utilization rate 5201 are compared with each other. It may be also preferable to calculate the loss rate 526 under control by dividing the controlled available band 529 by the processing speed 524 and compare the calculated loss rate 526 under control with the target loss rate 5202.

In FIG. 9, sequence 350 follows sequence 345 at which the maximum bandwidth 509 is calculated. At sequence 350, the route/resource calculation portion 204 transmits the specification-related information to the path specification portion 201. The specification-related information includes the traffic information table 500, the node bandwidth information table 520, the topology information table 530, and the node route information table 540.

At sequence 355, based on the specification-related information received at sequence 350, the path specification portion 201 generates information (hereafter referred to as specification information) for providing the node 111 with the band for a traffic the node 111 controls.

The process at sequence 355 will be described in detail with reference to FIG. 12.

Figure 12:
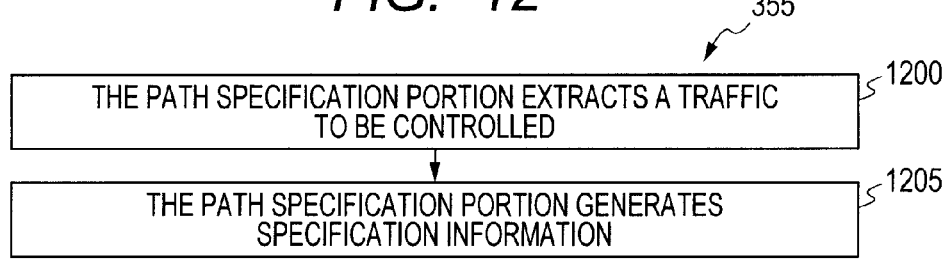
FIG. 12 is a flowchart illustrating a process of generating specification information according to the first embodiment of the invention.

FIG. 12 is a flowchart illustrating a process of generating specification information according to the first embodiment of the invention.

Step 1200

At step 1200, the path specification portion 201 extracts the traffic ID 501, the virtual NWID 502, the edge node ID 503, and the maximum bandwidth 509 from the row corresponding to the overflow flag 508 storing "YES" and the band control state 513 storing "OFF" in the traffic information table 500. That is, the path specification portion 201 extracts a high loss-rate traffic that causes a congestion state on the route for two or more nodes 111 and is free from the band control. The extracted traffic ID 501 is hereafter referred to as a limitation-enabling traffic ID.

The path specification portion 201 extracts the traffic ID 501, the virtual NWID 502, and the edge node ID 503 from the row corresponding to the overflow flag 508 storing "NO" and the band control state 513 storing "YES" in the traffic information table 500. The extracted traffic ID 501 is hereafter referred to as a limitation-disabling traffic ID.

Step 1205

At step 1205 after step 1200, the path specification portion 201 extracts the virtual NWID 502, the edge node ID 503 for the entry edge node, the maximum bandwidth 509, and the transit link ID 506 for the first link from the row corresponding to the traffic ID 501 equivalent to the limitation-enabling traffic ID in the traffic information table 500.

The path specification portion 201 extracts the row containing the node ID 531 and the connection link ID 533 equivalent to the extracted identifiers for the entry edge node and the first link from the topology information table 530. The path specification portion 201 extracts the port ID 532 from the extracted row in the topology information table 530 and generates the specification information based on the extracted information. That is, the path specification portion 201 uses the maximum bandwidth 509 calculated at sequence 345 to generate the specification information for controlling the traffic at the entry edge node.

For example, the generated specification information contains the edge node ID 503 for the entry edge node, the port ID 532, the virtual NWID 502, and the maximum bandwidth 509 to be specified. The value of the maximum bandwidth 509 is specified for the node 111 as the entry edge node. The specification information may contain a predetermined value calculated for a token bucket or a leaky bucket using the maximum bandwidth 509 as a function.

The path specification portion 201 extracts the virtual NWID 502, the edge node ID 503 as the entry edge node ID, and the port ID 532 in the topology information table 530 from the row containing the traffic ID 501 equivalent to the limitation-disabling traffic ID as well as the limitation-enabling traffic ID in the traffic information table 500. The path specification portion 201 generates the specification information based on the extracted information. The path specification portion 201 excludes the maximum bandwidth 509 for the limitation-disabling traffic ID from the specification information or includes a value before the band control in the specification information.

Sequence 360 follows sequence 355 at which the specification information is generated. At sequence 360, the path specification portion 201 allows the message transmission/reception portion 206 to transmit the specification information to the nodes 111. The path specification portion 201 may transmit the specification information only to the node 111 as the entry edge node.

After receiving the specification information, the nodes 111 limit traffic bands in accordance with the specification information received from the transport control server 100 at sequence 360 (365). Only the node 111 as the entry edge node may limit traffic bands at sequence 365.

The path specification portion 201 transmits the information in the traffic information table 500, the node bandwidth information table 520, the topology information table 530, and the node route information table 540 to the data storage portion 211 and requests it to update the tables (370).

The data storage portion 211 updates the tables based on the information received at sequence 370 (375). Specifically, the data storage portion 211 stores "ON" in the band control state 513 on the row containing the traffic ID 501 equivalent to the limitation-enabling traffic ID and stores "YES" in the band control state 513 on the row containing the traffic ID 501 equivalent to the limitation-disabling traffic ID in the traffic information table 500. The data storage portion 211 updates values in the other tables.

By performing the process in FIG. 9, the transport control server 100 can limit a band for entry into the network to a band for exit from the network on a high loss-rate traffic that causes a congestion state on the route for two or more nodes 111. The transport control server 100 can inhibit an influence on the other traffics by limiting a band for entry into the network to a band for exit from the network.

When detecting a congestion, the transport control server 100 can fast configure the node 111 by generating the specification information before a congestion state occurs. The following describes the process of previously generating the specification information with reference to FIGS. 13 and 14.

Figure 13:
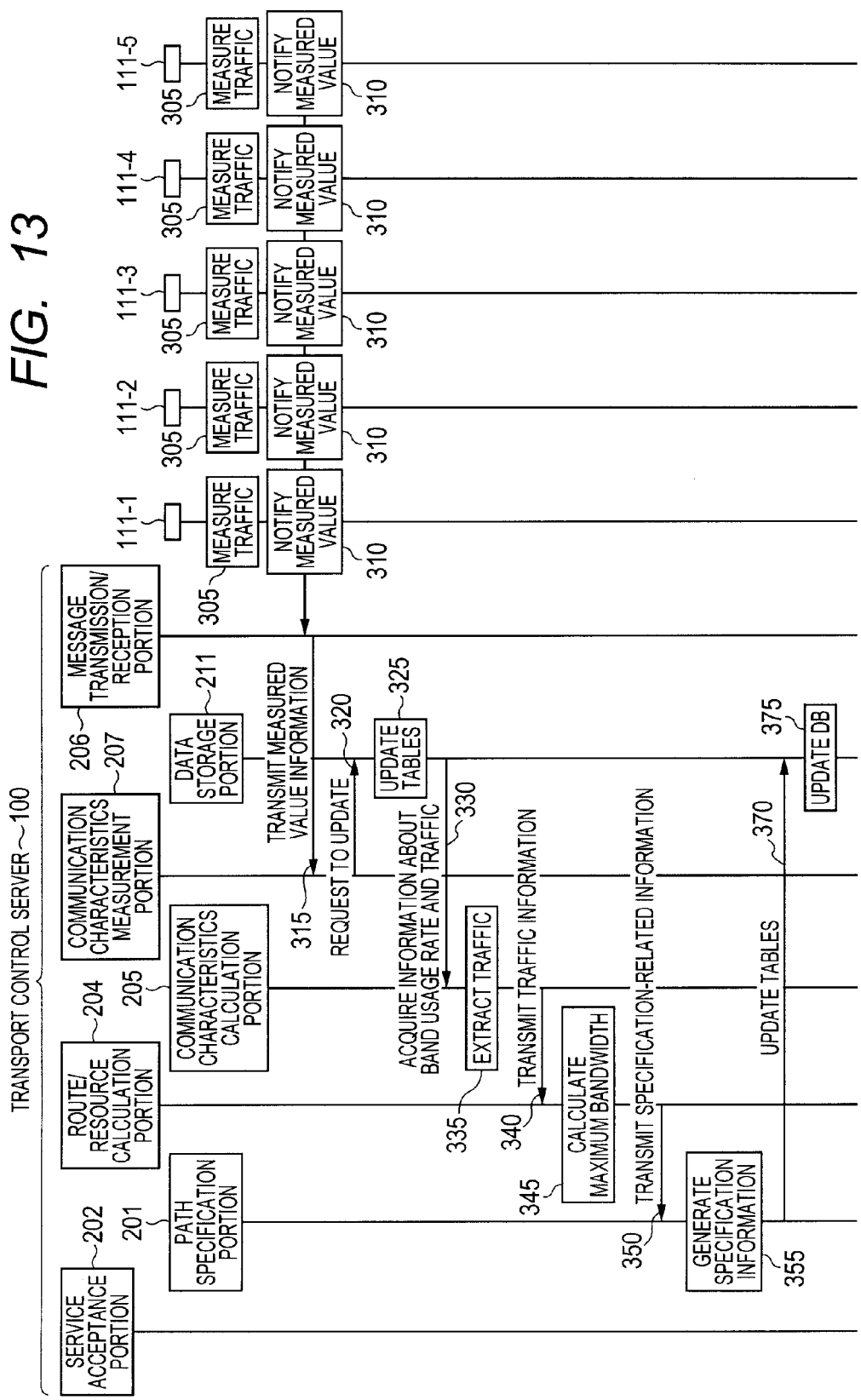
FIG. 13 is a sequence diagram illustrating a process of previously generating specification information according to the first embodiment of the invention.

FIG. 13 is a sequence diagram illustrating the process of previously generating the specification information according to the first embodiment of the invention.

Sequences 305 through 355 in FIG. 13 are equal to sequences 305 through 355 in FIG. 9.

At sequence 370, the path specification portion 201 transmits the traffic information table 500, the node bandwidth information table 520, the topology information table 530, and the node route information table 540 to the data storage portion 211 and requests it to update the tables. At sequence 375, the data storage portion 211 updates the tables based on the information received at sequence 370.

The process in FIG. 13 is performed at a predetermined cycle. In FIG. 13, the transport control server 100 calculates the maximum bandwidth 509 but does not transmit the specification information for limiting bands of the nodes 111 to the nodes 111.

Figure 14:
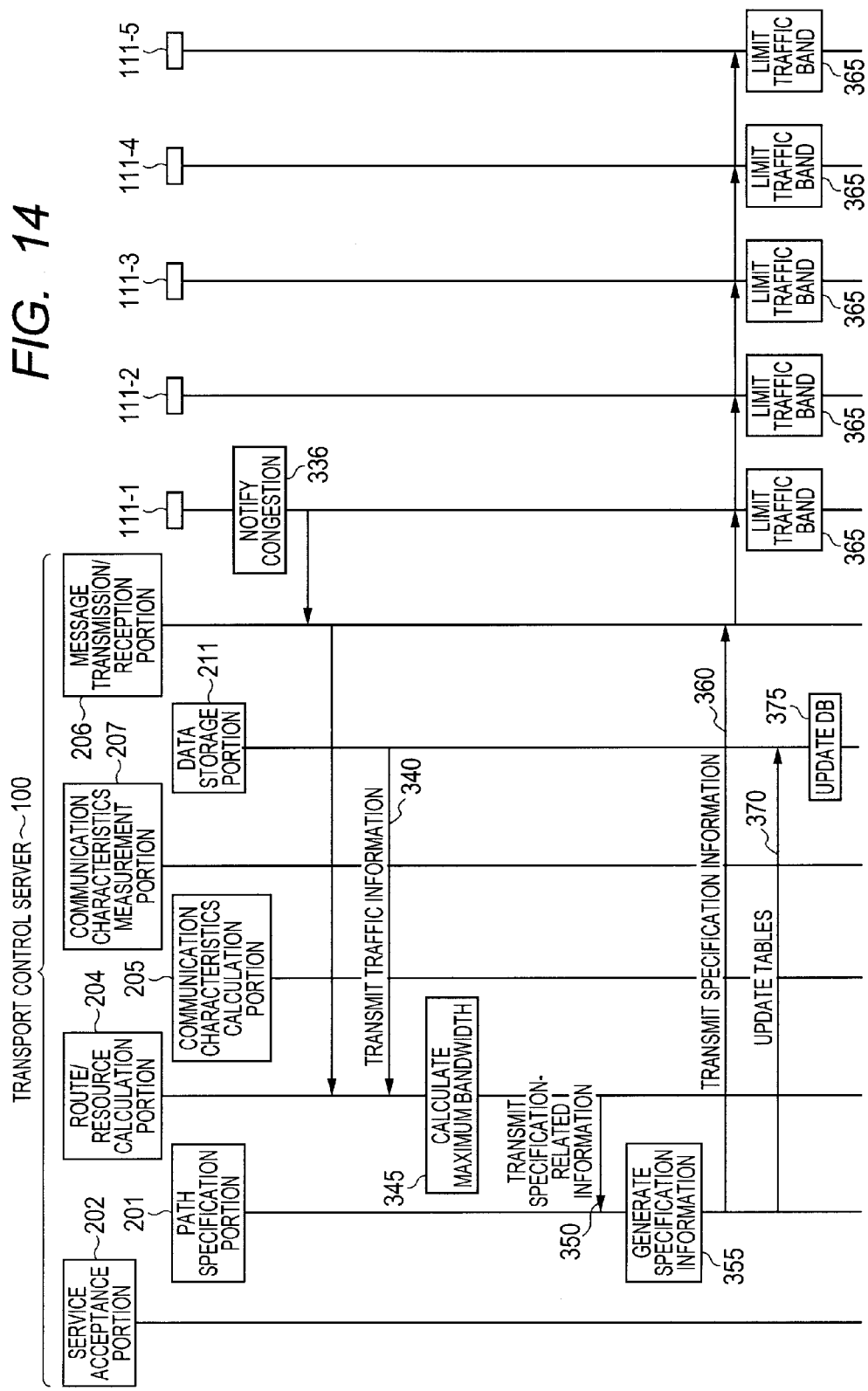
FIG. 14 is a sequence diagram illustrating a band control process using previously generated specification information according to the first embodiment of the invention.

FIG. 14 is a sequence diagram illustrating a band control process using previously generated specification information according to the first embodiment of the invention.

The process in FIG. 14 is performed when the process in FIG. 13 is performed at the predetermined cycle and the node 111 detects a congestion. The node 111 may previously maintain the target loss rate 5202 of the node bandwidth information table 520 and assume a congestion to occur when the loss rate for any of the components included in the node 111 exceeds the target loss rate 5202.

After detecting a congestion (336), the node 111-1 allows the message transmission/reception portion 206 to notify the route/resource calculation portion 204 of the detection of the congestion. The detection of the congestion is temporarily notified when a large amount of traffic temporarily occurs and the loss rate suddenly increases.

The node 111-1 may be temporarily notified of only an increase in the loss rate without transmission of detailed information such as the traffic band and the band usage rate and the loss rate on the link. Accordingly, the node 111 can fast notify the transport control server 100 of the detection of the congestion even when a packet is dropped unexpectedly.

At sequence 340, the route/resource calculation portion 204 references the data storage portion 211 and acquires the traffic information table 500, the node bandwidth information table 520, the topology information table 530, and the node route information table 540 as the traffic information.

Sequences 345 through 375 in FIG. 14 are equal to sequences 345 through 375 in FIG. 9.

Sequence 345 whether in FIG. 14 or in FIG. 13 may be used to calculate the maximum bandwidth 509 when the process in FIG. 13 previously generates the specification information and then the process in FIG. 14 limits bands for the nodes 111.

Second Embodiment

Figure 15:
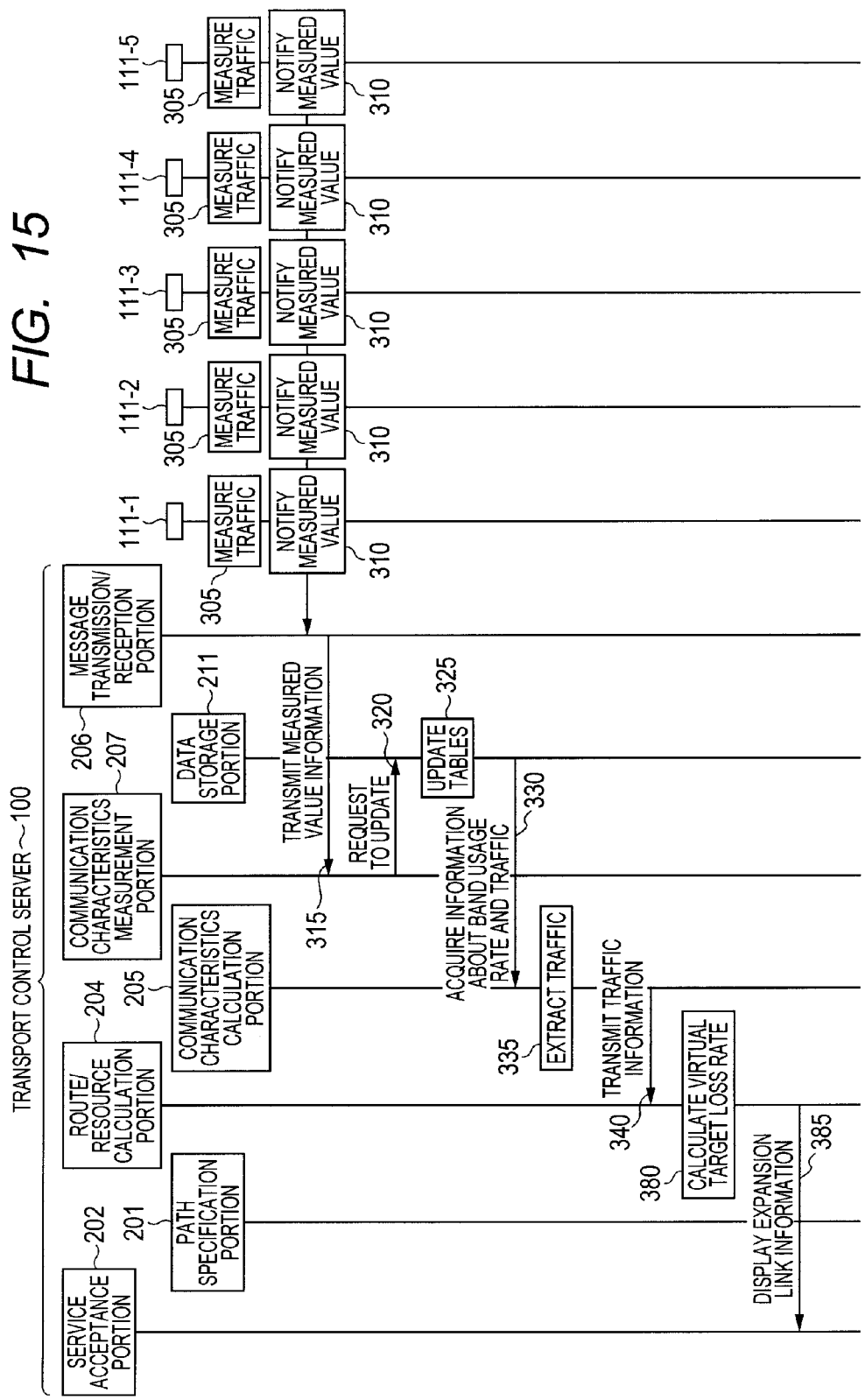
FIG. 15 is a sequence diagram illustrating a process of specifying a link to be expanded according to a second embodiment of the invention.

FIG. 15 is a sequence diagram illustrating a process of specifying a link to be expanded according to a second embodiment of the invention.

The transport control server 100 uses the process in FIG. 15 to generate information for determining which route (link) for the node 111 needs to be expanded. Sequences 305 through 340 in FIG. 15 are equal to sequences 305 through 340 in FIG. 9.

At sequence 380, the route/resource calculation portion 204 calculates a virtual target loss rate by calculating a loss rate on each route (link) of the node 111 in a virtual situation that one traffic is not dropped.

Figure 16:
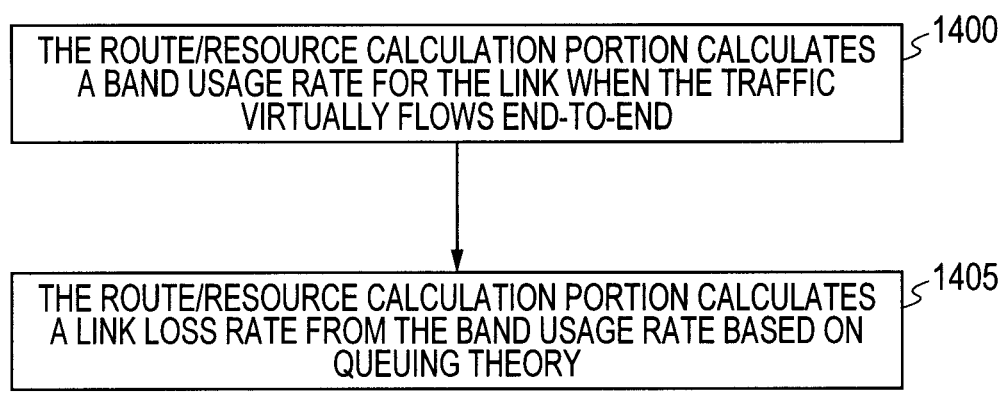
FIG. 16 is a flowchart illustrating a process of calculating a virtual target loss rate according to the second embodiment of the invention.

The following describes the process at sequence 380 in detail with reference to FIG. 16.

FIG. 16 is a flowchart illustrating a process of calculating a virtual target loss rate according to the second embodiment of the invention.

Step 1400

At step 1400, the route/resource calculation portion 204 extracts the traffic ID 501, the virtual NWID 502, the transit node ID 505, the transit link ID 506, and the measurement band 507 from the row corresponding to the overflow flag 508 storing "YES" in the traffic information table 500. That is, the route/resource calculation portion 204 extracts the information about a high loss-rate traffic that causes a congestion state on the route for two or more nodes 111.

The route/resource calculation portion 204 extracts, from the topology information table 530, the row containing the node ID 531 and the connection link ID 533 equivalent to the extracted transit node ID 505 and transit link ID 506 and extracts port ID 532 from the extracted row. That is, the route/resource calculation portion 204 extracts the port ID 532 through which a high loss-rate traffic passes and causes a congestion state on the route for two or more nodes 111.

The route/resource calculation portion 204 extracts, from the node route information table 540, a row containing the node ID 541, the virtual NWID 542, and the port ID 543 equivalent to the extracted node ID 531, virtual NWID 502, and port ID 532 and acquires the node ID 541, the virtual NWID 542, the port ID 543, and the transit configuration portion 544 in the extracted row. That is, the route/resource calculation portion 204 extracts the information about the route for the nodes 111 through which a high loss-rate traffic passes and causes a congestion state on the route for two or more nodes 111.

The route/resource calculation portion 204 extracts, from the node bandwidth information table 520, a row containing the node ID 521, the virtual NWID 523, and the configuration portion 522 equivalent to the extracted node ID 541, virtual NWID 542, and transit configuration portion 544 and extracts the available band 527 in the extracted row. That is, the route/resource calculation portion 204 extracts the available band 527 for traffics including a traffic that passes through the route for the nodes 111 and causes two or more congestion states.

The route/resource calculation portion 204 divides the available band 527 extracted in the process at step 1400 by the band (Bh) calculated by equation 2 at step 1100 in FIG. 11 for the traffic passing through each route. That is, the route/resource calculation portion 204 calculates an available band for the other traffics on the route including two or more nodes 111 where a high loss-rate traffic passes and causes a congestion state.

The route/resource calculation portion 204 adds the divided result and the extracted measurement band 507 for the entry edge node together. The route/resource calculation portion 204 stores the added result in the available band 527 and the controlled available band 529 in the row of the node bandwidth information table 520 extracted at step 1400 described above. That is, the route/resource calculation portion 204 stores the band of a traffic causing no congestion in the available band 527 and the controlled available band 529.

The route/resource calculation portion 204 performs the process at step 1400 on all traffics corresponding to the overflow flag 508 storing "YES" in the traffic information table 500 or all traffics for all rows corresponding to the control-target traffic ID 547 in the node route information table 540.

The controlled available band 529 according to the second embodiment does not indicate an available band when the traffic band is limited. The controlled available band 529 indicates an available band for the route of the nodes 111 on the condition that a traffic is not dropped while passing through the link in the network.

Step 1405

At step 1405 after step 1400, the route/resource calculation portion 204 extracts the node ID 521, the configuration portion 522, the virtual NWID 523, the processing speed 524, and the controlled available band 529 from the rows of the node bandwidth information table 520 and calculates the target loss rate 5202 when the controlled available band 529 indicates an available band. The queuing theory as shown in equation 3 is used to calculate the target loss rate 5202.

$$B = P_0 \frac{a^s}{S!} \rho^m \qquad \text{(Equation 3)}$$

$$P_0^{-1} = \sum_{r=0}^{s-1} \frac{a^r}{r!} + \frac{a^s}{s!} \times \frac{1-\rho^{m+1}}{1-\rho}$$

$$a = \lambda h$$

$$\rho = a/s$$

$$h = L/v$$

In equation 3, B denotes the target loss rate; a denotes the traffic density; S denotes the number of lines; ρ denotes the available band (bandwidth utilization rate 525 in the embodiment), m denotes the buffer or queue count; λ denotes the arrival rate; h denotes the packet transmission time; L denotes the average packet size; and v denotes the link band.

The route/resource calculation portion 204 stores the calculated target loss rate 5202 in the node bandwidth information table 520. The route/resource calculation portion 204 calculates the target loss rate 5202 for all rows in the node bandwidth information table 520.

At sequence 385 after sequence 380, the route/resource calculation portion 204 transmits the node bandwidth information table 520 as expansion link information to the service acceptance portion 202. The service acceptance portion 202 allows the management terminal to display the expansion link information.

The manager uses the management terminal connected to the transport control server 100 to reference the target loss rate 5202 in the node bandwidth information table 520 contained in the expansion link information. The manager can recognize that bands are exhausted for the configuration portion 522 in the node ID 521 provided with the large target loss rate 5202. As a result, the manager can enhance hardware for the node 111 in want of bands or change the route for the traffic.

The route/resource calculation portion 204 may transmit the specification-related information according to the first embodiment and the expansion link information according to the second embodiment to the service acceptance portion 202. The route/resource calculation portion 204 may display these pieces of information for the manager through the management terminal and allow the manager to determine whether to limit the traffic band or increase the resource for each node 111 or link.

The second embodiment uses the traffic bandwidth at the entry edge node to calculate the amount of dropped traffic in each node 111. This makes it possible to accurately determine which component of which node 111 needs to be enhanced.

The embodiment can accurately extract a traffic whose band needs to be controlled. Calculating the band for the extracted traffic can suppress an influence of congestion on the network and prevent a burden on the processor and memory of the control server due to the band control.

The transport control server according to the embodiment extracts the traffic to be controlled as described above. For this purpose, the traffic to be extracted indicates a difference between traffic bands at the entry edge node and the exit edge node of the network so that the difference is greater than or equal to a specified threshold value. At the same time, the traffic to be extracted passes through a route twice or more corresponding to the node 111 whose loss rate 545 is larger than the target loss rate 548. The transport control server limits the band for the extracted traffic at the entry edge node in the network, making it possible to increase bands available for the other traffics.

In addition, the transport control server according to the embodiment calculates a band for the traffic under control capable of being applied to the route or the link of the nodes 111 based on the loss rate 526, the controlled available band 529, the target bandwidth utilization rate 5201, and the total of traffic bands for the route of the nodes 111 to be passed through. Accordingly, the transport control server can calculate bands to be controlled in consideration of not only one traffic but also multiple traffics. Further, the transport control server can maintain a minimum available band for each traffic in consideration of the minimum bandwidth 504.

The transport control server according to the embodiment maintains the available band for each of components provided for the node 111 and calculates a loss rate for each route including multiple components through which the traffic passes. The transport control server can control the band for each link on the basis of each route for the node 111 because each route corresponds to each link between the nodes 111.

The transport control server according to the embodiment can limit bands by extracting a traffic to be controlled and burdening the processor and the memory provided for the transport control server 100 and the node 111.

The present invention is applicable to a network system that automatically calculates route candidates for the traffic.

What is claimed is:

1. A transport control server coupled to a plurality of nodes in a network through which a plurality of traffics pass, the transport control server, comprising:
   a communication interface configured to receive bandwidth information from each of the nodes when the traffic pass through the nodes; and a control processor configured to calculate, for each of the traffics, bandwidths at an entry edge node and at exit edge node, based on the received bandwidth information; define as a first traffic, based on the calculated bandwidths at the entry edge node and the exit edge node, a traffic having a bandwidth that is discarded in the course of passing through the network that is larger than a first predetermined bandwidth; and define as a second traffic, based on the received bandwidth information, the first traffic having a bandwidth at the two or more nodes that exceeds a specified second bandwidth.

2. The transport control server according to claim 1, wherein the control processor is further configured to calculate the second bandwidth at each of the nodes that the second traffic passes through based on the received bandwidth information; and change the calculated bandwidth of the second traffic at each of the nodes with a calculated third bandwidth of the second traffic at the exit edge node.

3. The transport control server according to claim 1, wherein the control processor is further configured to obtain, based on the received bandwidth information, a bandwidth of the second traffic at the exit edge node of the second traffic, and limit a bandwidth of the second traffic at the entry edge node to the obtained bandwidth of the second traffic at the exit edge node.

4. The transport control server according to claim 2, wherein a communication interface further receives bandwidth information from the nodes at a predetermined interval; and the bandwidth of the second traffic at the entry node is limited to the obtained bandwidth of the second traffic at the exit edge node, when the received information from the node indicated a congestion.

5. The transport control server according to claim 3, wherein the control processor is further configured to limit a bandwidth, wherein a bandwidth of the second traffic that limits the traffic to be controlled at the entry edge node indicates a maximum bandwidth.

6. The transport control server according to claim 1, wherein the control processor further calculates a band usage rate and a loss rate for each of a plurality of components included in each of the plurality of nodes.

7. The transport control server according to claim 6, wherein the control processor further calculates a band usage rate for links between the nodes when the traffic virtually flows end-to-end.

8. The transport control server according to claim 2, wherein the control processor further calculates an expected discard rate of the traffics at each of the nodes based on the third bandwidth.

9. A transport control system comprising:
   a plurality of nodes through each of which a plurality of traffics pass; and
   a transport control server connected to the nodes,
   wherein the nodes transmit bandwidth information during passage of the traffics through each of the nodes to the transport control server;
   wherein the transport control server is configured to calculate for each of the traffics, bandwidths at an entry edge node and at an exit edge node based on the received bandwidth information;
   define as a first traffic, based on the calculated bandwidths at the entry edge node and the exit edge node,
   a traffic having a bandwidth that is discarded in the course of passing through the network that is larger than a first predetermined bandwidth; and
   define as a second traffic, based on the received bandwidth information, the first traffic having a bandwidth at the two or more nodes that exceeds a specified second bandwidth.

10. The transport control system according to claim 9, the transport control server further configured to
    calculate the second bandwidth at each of the nodes that the second traffic passes through based on the received bandwidth information; and
    change the calculated bandwidth of the second traffic at each of the nodes with the calculated third bandwidth of the second traffic at the exit edge node;
    wherein the transport control server compares the calculated third bandwidth with a specified fourth bandwidth;
    wherein the transport control server calculates a value limiting a bandwidth for the second traffic at the entry edge node for the second traffic in accordance with the comparison result; and
    wherein, when the third bandwidth equals the specified fourth bandwidth as a result of the comparison, the transport control server uses the extracted bandwidth at the exit edge node for the second traffic to limit a bandwidth at the entry edge node for the second traffic.

11. The transport control system according to claim 10,
    wherein the nodes transmit bandwidth information at a specified interval during passage of the traffics through each of the nodes to the transport control server; and
    wherein, when receiving notification indicative of a congestion state from each of the nodes, the transport control server uses the calculated bandwidth at the exit edge node for the second traffic to limit a bandwidth at the entry edge node for the second traffic.

12. The transport control system according to claim 10,
    wherein a bandwidth that limits the traffic to be controlled at the entry edge node indicates a maximum bandwidth.

13. The transport control system according to claim 9,
    wherein the transport control server calculates a band usage rate and a loss rate for each of a plurality of components included in each of the plurality of nodes.

14. The transport control system according to claim 13,
    wherein the transport control server calculates a band usage rate for links between the nodes when the traffic virtually flows end-to-end.

15. The transport control system according to claim 9,
    wherein the transport control server is further configured to
    calculate the second bandwidth at each of the nodes that the second traffic passes through based on the received bandwidth information; and
    change the calculated bandwidth of the second traffic at each of the nodes
    with a calculated third bandwidth of the second traffic at the entry edge node; and
    calculate an expected discard rate of the traffics at each of the nodes based on the third bandwidth.

16. A transport control method for a transport control server coupled to a plurality of nodes in a network through which a plurality of traffics pass, the method comprising the steps of:
    allowing the nodes to transmit bandwidth information during passage of the traffics through each of the nodes to the transport control server;
    allowing the transport control server to calculate, for each of the traffics, bandwidths at an entry edge node and a bandwidth for the traffic at an exit edge node from the received bandwidth information;
    allowing the transport control server to define as a first traffic, based on the calculated bandwidths at the entry edge node and the exit edge node;
    a traffic having a bandwidth that is discarded in the course of passing through the network that is larger than a first predetermined bandwidth;
    allowing the transport control server to define as a second traffic, based on the received bandwidth information, the first traffic
    having a bandwidth at the two or more nodes that exceeds a specified second bandwidth; and
    allowing the transport control server to use the calculated bandwidth at the exit edge node for the second traffic and limit a bandwidth at the entry edge node for the second traffic.

* * * * *